United States Patent
Oehring

(10) Patent No.: US 9,587,649 B2
(45) Date of Patent: Mar. 7, 2017

(54) SYSTEM FOR REDUCING NOISE IN A HYDRAULIC FRACTURING FLEET

(71) Applicant: US Well Services LLC, Houston, TX (US)

(72) Inventor: Jared Oehring, Houston, TX (US)

(73) Assignee: US WELL SERVICES LLC, Houston, TX (US)

(*) Notice: Subject to any disclaimer, the term of this patent is extended or adjusted under 35 U.S.C. 154(b) by 0 days.

(21) Appl. No.: 14/995,811

(22) Filed: Jan. 14, 2016

(65) Prior Publication Data

US 2016/0208592 A1 Jul. 21, 2016

Related U.S. Application Data

(60) Provisional application No. 62/103,414, filed on Jan. 14, 2015, provisional application No. 62/253,948, filed on Nov. 11, 2015, provisional application No. 62/264,699, filed on Dec. 8, 2015.

(51) Int. Cl.

| | |
|---|---|
| *E21B 43/26* | (2006.01) |
| *F04D 29/66* | (2006.01) |
| *F04D 13/06* | (2006.01) |
| *F04D 29/42* | (2006.01) |
| *F04D 29/58* | (2006.01) |
| *H02K 9/04* | (2006.01) |

(52) U.S. Cl.
CPC ............ *F04D 29/669* (2013.01); *E21B 43/26* (2013.01); *F04D 13/06* (2013.01); *F04D 29/4226* (2013.01); *F04D 29/5806* (2013.01); *F04D 29/664* (2013.01); *F04D 29/667* (2013.01); *H02K 9/04* (2013.01); *F05D 2250/51* (2013.01)

(58) Field of Classification Search
CPC ....... H02K 9/04; F04D 29/669; F04D 29/667; F04D 29/664; F04D 13/06; F04D 29/5806; F04D 29/4226; F04D 2250/51; E21B 43/26
USPC ....................................................... 166/308.1
See application file for complete search history.

(56) References Cited

U.S. PATENT DOCUMENTS

| | | | |
|---|---|---|---|
| 2,061,039 A | 10/1962 | Peters | |
| 3,773,140 A | 11/1973 | Mahajan | |
| 4,226,299 A * | 10/1980 | Hansen | ..................... E04B 1/86 181/210 |
| 4,456,092 A * | 6/1984 | Kubozuka | ............... F02B 77/13 181/204 |
| 5,548,093 A | 8/1996 | Sato | |

(Continued)

FOREIGN PATENT DOCUMENTS

JP 2004264589 9/2004

*Primary Examiner* — Robert E Fuller
*Assistant Examiner* — Steven MacDonald
(74) *Attorney, Agent, or Firm* — Hogan Lovells US LLP

(57) ABSTRACT

Noise generated by a hydraulic fracturing system is abated by locating noise reduction equipment at strategic locations, and also by routing inlet and exit air along designated paths. Noise insulation panels are disposed around trailer mounted machinery to attenuate and redirect the noise generated by the machinery. The panels extend a distance above the machinery so that the noise is directed upward and away from operations personnel proximate the machinery. Air handling equipment having air inlets and exits that are formed to reduce turbulence, and thus noise, as well as redirect the flow of air to attenuate noise generated by its flow within the inlets and exits.

13 Claims, 17 Drawing Sheets

(56) References Cited

U.S. PATENT DOCUMENTS

| | | | | |
|---|---|---|---|---|
| 5,655,361 | A * | 8/1997 | Kishi | F02K 1/827 181/222 |
| 6,202,702 | B1 | 3/2001 | Ohira | |
| 6,254,462 | B1 * | 7/2001 | Kelton | B24C 3/065 451/350 |
| 6,802,690 | B2 | 10/2004 | Han | |
| 8,534,235 | B2 | 9/2013 | Chandler | |
| 8,727,068 | B2 | 5/2014 | Bruin | |
| 9,103,193 | B2 | 8/2015 | Coli | |
| 2007/0187163 | A1 * | 8/2007 | Cone | B62D 25/10 180/69.2 |
| 2008/0112802 | A1 * | 5/2008 | Orlando | F02K 1/08 415/208.1 |
| 2009/0065299 | A1 * | 3/2009 | Vito | A63B 59/50 181/294 |
| 2009/0188181 | A1 * | 7/2009 | Forbis | E04B 1/80 52/173.1 |
| 2010/0000508 | A1 * | 1/2010 | Chandler | F24H 1/06 126/116 R |
| 2013/0233542 | A1 | 9/2013 | Shampine et al. | |
| 2014/0000899 | A1 * | 1/2014 | Nevison | E21B 43/26 166/308.1 |
| 2014/0096974 | A1 * | 4/2014 | Coli | E21B 43/26 166/358 |
| 2015/0083426 | A1 * | 3/2015 | Lesko | B60P 1/00 166/308.1 |
| 2015/0114652 | A1 * | 4/2015 | Lestz | E21B 43/26 166/308.1 |
| 2015/0225113 | A1 * | 8/2015 | Lungu | G10K 11/162 181/198 |
| 2016/0177678 | A1 * | 6/2016 | Morris | F01D 15/00 60/772 |

* cited by examiner

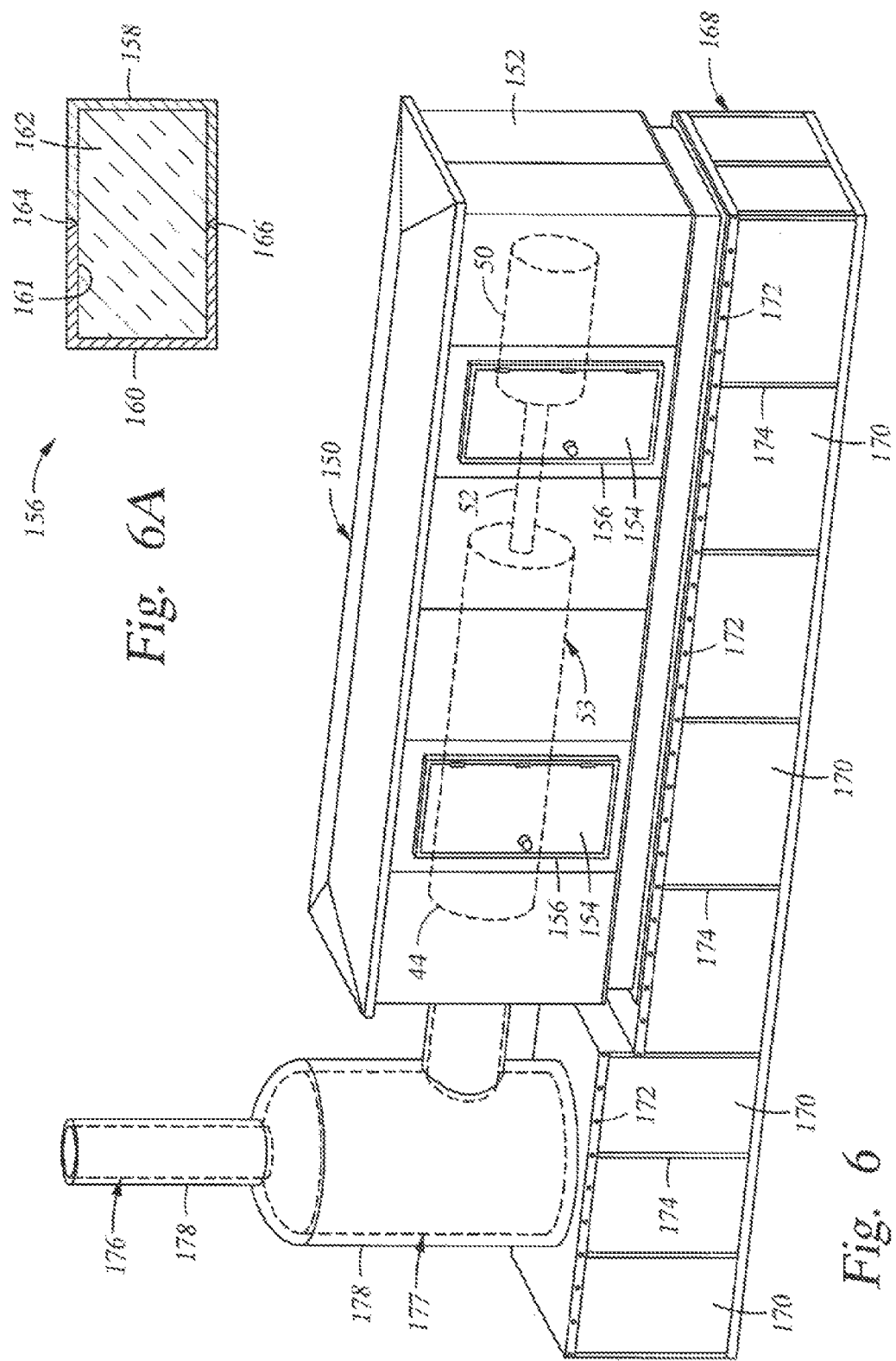

SYSTEM FOR REDUCING NOISE IN A HYDRAULIC FRACTURING FLEET

CROSS REFERENCE TO RELATED APPLICATIONS

This application is a continuation of, and claims priority to and the benefit of, U.S. Provisional Application Ser. No. 62/103,414, filed Jan. 14, 2015, U.S. Provisional Application Ser. No. 62/253,948, filed Nov. 11, 2015, and U.S. Provisional Application Ser. No. 62/264,699, filed Dec. 8, 2015, the full disclosures of which are hereby incorporated by reference herein for all purposes.

BACKGROUND OF THE INVENTION

1. Field of Invention

The present disclosure relates to hydraulic fracturing of subterranean formations. In particular, the present disclosure relates to a methods and devices for reducing noise during hydraulic fracturing of a subterranean formation.

2. Description of Prior Art

Hydraulic fracturing is a technique used to stimulate production from some hydrocarbon producing wells. The technique usually involves injecting fluid into a wellbore at a pressure sufficient to generate fissures in the formation surrounding the wellbore. Typically the pressurized fluid is injected into a portion of the wellbore that is pressure isolated from the remaining length of the wellbore so that fracturing is limited to a designated portion of the formation. The fracturing fluid, whose primary component is usually water, includes proppant (such as sand or aluminum oxide) that migrate into the fractures with the fracturing fluid and remain to prop open the fractures after pressure is no longer applied to the wellbore.

Traditionally, the fracturing fluid has been pressurized on surface by high pressure pumps powered by diesel engines. To produce the pressures required for hydraulic fracturing, the pumps and associated engines have substantial volume and mass. Heavy duty trailers are required for transporting the large and heavy pumps and engines to sites where wellbores are being fractured. Each pump is usually equipped with a water manifold (referred to as a fluid end) which contains seats, valves, and keepers internally. These parts allow the pump to draw in low pressure fluid (approximately 100 psi) and discharge the same fluid at high pressures (over 10,000 psi). Recently electrical motors have been introduced to replace the diesel motors, which greatly reduces the noise generated by the equipment during operation.

SUMMARY OF THE INVENTION

Disclosed herein is an example of a hydraulic fracturing system for fracturing a subterranean formation and a method of fracturing. One example of a hydraulic fracturing system includes a hydration unit having an inlet in communication with a source of fluid and with a source of additive, and having a discharge that selectively contains a mixture of the fluid and additive, a blender having an inlet in communication with a source of proppant and with the discharge of the hydration unit, and having a discharge that selectively contains a mixture of the fluid, additive, and proppant to define a slurry, a fracturing pump having an inlet in communication with the discharge of the blender, and a discharge in communication with the formation, a trailer on which the hydration unit or blender is mounted, noise reduction panels arranged along an outer periphery of the trailer and which extend from an upper surface of the trailer to above a piece of rotating machinery mounted on the trailer, the noise reduction panels having a layer of sound absorbing material laminated to a layer of structural material, and a cooling system mounted to the piece of rotating machinery that includes an intake shroud with an opening facing the upper surface of the trailer and sidewalls that gradually converge towards one another to maintain a substantially laminar flow in the shroud, and a discharge formed on a housing of the rotating machinery that is in fluid communication with the intake shroud and that includes a discharge louver having an entrance that lies in a plane substantially perpendicular with the upper surface of the trailer, and an exit that faces the upper surface of the trailer. In one example, the discharge louver is made up of laterally spaced apart vertical side walls, and an outer surface extending between the vertical side walls. The outer surface of the discharge louver has a portion attached to the housing of the rotating machinery that lies in a plane substantially parallel with the upper surface of the trailer, and a portion distal from the housing of the rotating machinery that lies in a plane substantially perpendicular with the upper surface of the trailer. The hydraulic fracturing system can further include noise insulation material mounted to the discharge louver. A natural gas powered turbine generator can be included with the system that has an electrical output in communication with the blender, hydration unit, and fracturing pump, and a housing around the turbine generator, wherein the housing includes noise abatement material. The housing around the turbine generator can have a door frame formed from a pair of U-shaped sections joined together that define a cavity, and wherein noise abatement material is disposed in the cavity. A skirt can be included with the system that extends between the housing and the ground, wherein the skirt has noise abatement material. In one example, included with the system is a compressor unit having a compressor with an inlet in communication with a supply of natural gas, and an exit in communication with a compressor, a housing covering the unit that comprises noise abatement material, an enclosure having discharge piping containing gas compressed by the compressor, and a fan that draws cooling air into the enclosure that exits the enclosure from an opening on an upper surface of the enclosure. The cooling system optionally includes a motor attached to an air blower. The system can further include a cover having an upper surface disposed over the motor and air blower, and side walls that extend downward from the upper surface and past the opening of the intake shroud. A proppant source can be included that has silos, a dust recovery system having a vacuum system and filters, and noise reduction panels disposed around the vacuum system and panels, wherein the noise reduction panels includes noise abatement material. In one embodiment the system includes a plurality of fracturing pumps that are arranged in a row, and a sound wall disposed adjacent an end of the row, wherein the sound wall is made up of a frame mounted to a base, vertical and horizontal beams mounted to the frame, and planar wall panels set between adjacent vertical and horizontal beams, and wherein the wall panels include noise abatement material. In an alternative, included are a plurality of turbine generators arranged in a row, and compressor units arranged in a row and that are disposed substantially perpendicular to and adjacent the turbine generators, and sound walls disposed on opposing ends of the row of compressors, and adjacent to the compressors on a side that is opposite from the turbine generators.

Another example of a hydraulic fracturing system for fracturing a subterranean formation a fracturing system for pressurizing the slurry and injecting the slurry into a wellbore that intersects the formation, a mounting surface, a piece of rotating machinery on the mounting surface, and a cooling system mounted to the piece of rotating machinery that includes a blower, an intake shroud having a flow path defined therein between ambient and an inlet to the blower, and that has a cross sectional area that gradually reduces to maintain a substantially laminar flow in the shroud, and a discharge formed on a housing of the rotating machinery that is in fluid communication with an exit of the blower and that has a discharge louver with an inner surface that is profiled so that cooling fluid enters the discharge louver from the housing along a path substantially parallel with an upper surface of the mounting surface, and that when cooling fluid exits the discharge louver, the exiting cooling fluid flows along a path that is substantially perpendicular with the mounting surface. In an alternative, the intake shroud has an opening facing the mounting surface, and wherein the discharge louver has an exit facing the mounting surface. The hydraulic fracturing system can further include panels mounted on the mounting surface that extend along a periphery of the rotating machinery and above the rotating machinery, so that the panels block noise generated by the rotating machinery from entering an operations area adjacent the mounting surface. The mounting surface can be part of a trailer, a truck, a body load, or a skid.

Also included is a method of hydraulically fracturing a subterranean formation that includes forming a slurry of proppant and fluid, pressurizing the slurry and introducing the slurry to the formation to create a fracture in the formation, operating rotating machinery on a trailer, and abating noise generated by the rotating machinery with panels on the trailer having noise abatement material, and that extend around a periphery of and above the rotating machinery. The rotating machinery can include motors, pumps, and blowers that are part of a blender, proppant source, chemical additive source, frac pump, or a hydration unit. The method can further include directing flowing fluid to a blower along a path that changes the direction of the flowing fluid at least around 90° along a curved surface so that the flowing fluid remains coherent and does not produce eddy currents. Optionally, noise can be abated from a plurality of fracturing pumps that are arranged in a row by disposing a sound wall adjacent an end of the row.

BRIEF DESCRIPTION OF DRAWINGS

Some of the features and benefits of the present invention having been stated, others will become apparent as the description proceeds when taken in conjunction with the accompanying drawings, in which:

FIG. 6 is a side view of an example of a turbine generator in a housing with noise reduction equipment.

FIG. 6A is a side section view of an example of a door frame with insulation.

Figure 1:
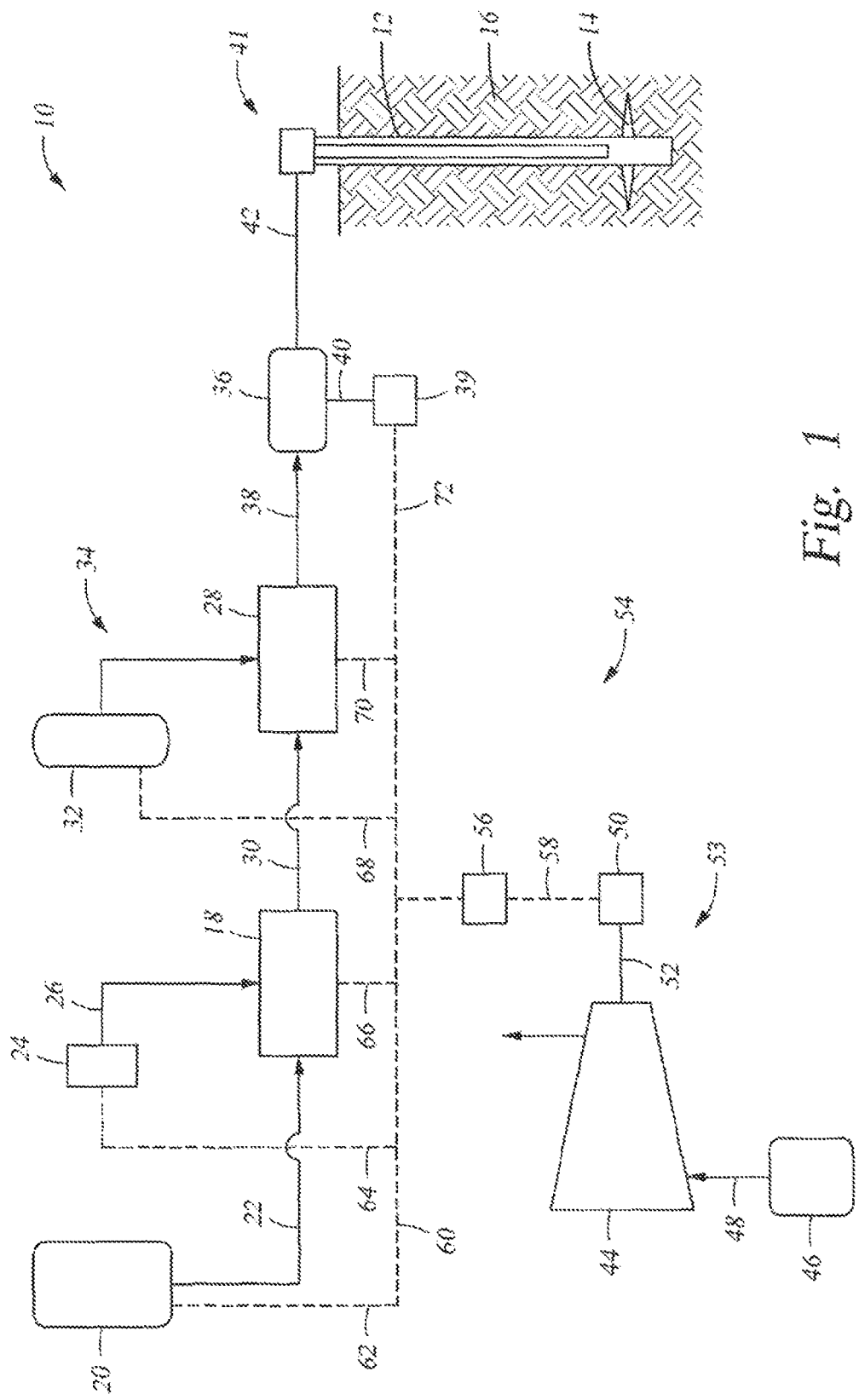
FIG. 1 is a schematic of an example of a hydraulic fracturing system.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 is a schematic example of a hydraulic fracturing system 10 that is used for pressurizing a wellbore 12 to create fractures 14 in a subterranean formation 16 that surrounds the wellbore 12. Included with the system 10 is a hydration unit 18 that receives fluid from a fluid source 20 via line 22, and also selectively receives additives from an additive source 24 via line 26. Additive source 24 can be separate from the hydration unit 18 as a stand along unit, or can be included as part of the same unit as the hydration unit 18. The fluid, which in one example is water, is mixed inside of the hydration unit 18 with the additives. In an embodiment, the fluid and additives are mixed over a period of time to allow for uniform distribution of the additives within the fluid. In the example of FIG. 1, the fluid and additive mixture is transferred to a blender 28 via line 30. A proppant source 32 contains proppant, which is delivered to the blender 28 as represented by line 34, where line 34 can be a conveyer. Inside the blender 28, the proppant and fluid/additive mixture are combined to form a slurry, which is then transferred to a fracturing pump 36 via line 38. Blender 28 can have an onboard chemical additive system, such as with chemical pumps and augers. Optionally, additive source 24 can provide chemicals to blender 28; or a separate and standalone chemical additive system (not shown) can be provided for delivering chemicals to the blender 28. In an example, the pressure of the slurry in line 38 ranges from around 80 psi to around 100 psi. The pressure of the slurry can be increased up to around 15,000 psi by pump 36. A motor 39, which connects to pump 36 via shaft 40, drives pump 36 so that it can pressurize the slurry. In one example, the motor 39 is controlled by a variable frequency drive ("VFD"). After being discharged from pump 36, slurry is injected into a wellhead assembly 41; discharge piping 42 connects discharge of pump 36 with wellhead assembly 41 and provides a conduit for the slurry between the pump 36 and the wellhead assembly 41. In an alternative, hoses or other connections can be used to provide a conduit for the slurry between the pump 36 and the wellhead assembly 41. Optionally, any type of fluid can be pressurized by the fracturing pump 36 to form an injection fluid that is then injected into the wellbore 12 for fracturing the formation 14, and is not limited to fluids having chemicals or proppant.

An example of a turbine 44 is provided in the example of FIG. 1 and which receives a combustible fuel from a fuel source 46 via a feed line 48. In one example, the combustible fuel is natural gas, and the fuel source 46 can be a container of natural gas or a well (not shown) proximate the turbine 44. Combustion of the fuel in the turbine 44 in turn powers a generator 50 that produces electricity. Shaft 52 connects generator 50 to turbine 44. The combination of the turbine 44, generator 50, and shaft 52 define a turbine generator 53. In another example, gearing can also be used to connect the turbine 44 and generator 50. An example of a micro-grid 54 is further illustrated in FIG. 1, and which distributes electricity generated by the turbine generator 53. Included with the micro-grid 54 is a transformer 56 for stepping down voltage of the electricity generated by the generator 50 to a voltage more compatible for use by electrical powered devices in the hydraulic fracturing system 10. In another example, the power generator by the turbine generator and the power utilized by the electrical powered devices in the hydraulic fracturing system 10 are of the same voltage, such as 4160 V so that main power transformers are not needed. In one embodiment, multiple 3500 kVA dry cast coil transformers are utilized. Electricity generated in generator 50 is conveyed to transformer 56 via line 58. In one example, transformer 56 steps the voltage down from 13.8 kV to around 600 V. Other step down voltages can include 4,160 V, 480 V, or other voltages. The output or low voltage side of the transformer 56 connects to a power bus 60, lines 62, 64, 66, 68, 70, and 72 connect to power bus 60 and deliver electricity to electrically powered end users in the system 10. More specifically, line 62 connects fluid source 20 to bus 60, line 64 connects additive source 24 to bus, line 66 connects hydration unit 18 to bus 60, line 68 connects proppant source 32 to bus 60, line 70 connects blender 28 to bus 60, and line 72 connects motor 39 to bus 60. In an example, additive source 24 contains ten or more chemical pumps for supplementing the existing chemical pumps on the hydration unit 18 and blender 28. Chemicals from the additive source 24 can be delivered via lines 26 to either the hydration unit 18 and/or the blender 28.

An advantage of the micro-grid 54 is that it can reduce noise. Further, in conjunction with the micro-grid 54, when multiple fracturing pumps 36 are employed, the pumps 36 can be arranged along a single side of the system 10 to create one high voltage area. Optionally, generators other than turbine generators can be included in the system 10, such as diesel engine generators or natural gas engine generators. In an example when the combustion fuel is natural gas, electric natural gas screw compressors can be included that operate on 480 V delivered from small transformers on the turbine— which can provide 480 power for the turbine motor control center (not shown) as well as the gas compressors. In an alternative example, the power generation can take place at a remote site with power being transmitted to the well pad. In one embodiment load banks can be incorporated into the micro grid. Load shed devices can be incorporated into the micro grid, as well as cooling units for the turbine air intake. Switchgears for power distribution can be included, and that may be trailer mounted, on a skid, or truck. Optionally included are 3500 kVA transformers to transform power from 13.8 kV to 600 V (working voltage), but can be other voltages. An auxiliary unit (not shown) can be included with the system 10 and which provides power for blender unit 28, hydration unit 18, chemical additive/liquid Additive unit, sand conveyer belt, dust vacuum system, wireline, data van, water transfer, heaters, and other needed electrical connections on one or more voltages to the mobile micro power grid. In one embodiment, each auxiliary unit includes, 3500 kVA transformer, variable frequency drive for blender discharge pump's electric motor, 1750 HP, 600 V, 1700 amp 6 pulse VFD. For each VFD, a six pulse converter section employs diode bridge rectification to convert AC to DC. Converter section is unaffected by phase rotation/phase sequence. Overall DC bus design is passive capacitive filter to minimize ripple and maximize power-loss ride-through. DC bus capacitance (total filter capacitance) can be used that is sized to eliminate any requirement for bus inductance (for filtering purposes) when used on a 3-phase system. DC Bus voltage and current can be monitored by a control section to prevent damage to either the drive or the driven equipment. An inverter section makes use of the insulated gate bipolar transistor ("IGBT") power switching transistors to convert DC to three-phase, variable frequency, sinusoidal coded PWM waveform. IGBT initialization testing can be performed by the control section on each power up and run command. Each IGBT can have reversed biased diodes (free wheeling) to prevent failure when subjected to motor discharge spikes. Each IGBT can be sized (current) to allow the drive to operate at 100% (current) continuous and 120% (current) for up to 60 seconds. Output currents in each phase can be monitored using Hall Effect current transducers to enabling control of flux current, torque current, and providing protection to both the drive and driven equipment. The inverter section can sense and interrupt a phase-to-phase or phase-to-ground fault on the output of the drive. In an example, the control section is designed to prove complete monitoring and protection of drive internal operations while communicating to users at the equipment or at the datavan through one or more user interfaces. Microprocessor logic circuits can be isolated from power circuits. Microprocessor diagnostics can be performed (on application of power) to prove functionality and viability of the microprocessor. Motor diagnostics can be performed (on application of power and each start) to prevent damage to a grounded or shorted motor. The motor diagnostics may be disabled when using a low impedance or high-speed motor. The output voltage can be adjustable from 0 to rated input voltage. The output frequency range can be adjustable for a maximum frequency output of 299 Hz. The output (inverter) section of the VFD can produce a pulse width modulation ("PWM") sinusoidal coded waveform. The motor control center can include soft start for blender hydraulics' electric motor with full voltage non-reversing and hand-off-auto switch. Soft start can be included for hydration units hydraulics' electric motor with full voltage non-reversing and hand-off-auto switch. In one example, as part of the micro grid, VFDs as described above can be used to control the speed of electric motors on frac pumps, blenders, water transfer, and other equipment as needed. In addition, soft starts can be used to start electric motors that are connected to blender, hydration, and/or chemical additive unit hydraulic systems and other equipment that does not need variable frequency drive or variable speed. A motor soft starter is a device used with AC electrical motors to temporarily reduce the load and torque in the power train and electric current surge of the motor during start-up. This reduces the mechanical stress on the motor and shaft, as well as the electrodynamic stresses on the attached power cables and electrical distribution network, extending the lifespan of the system. In one example a soft start and/or VFD can be provided for a separate chemical additive unit or other needed equipment. These components can be packaged onto a single unit or be separated and packaged on different units.

Figure 2:
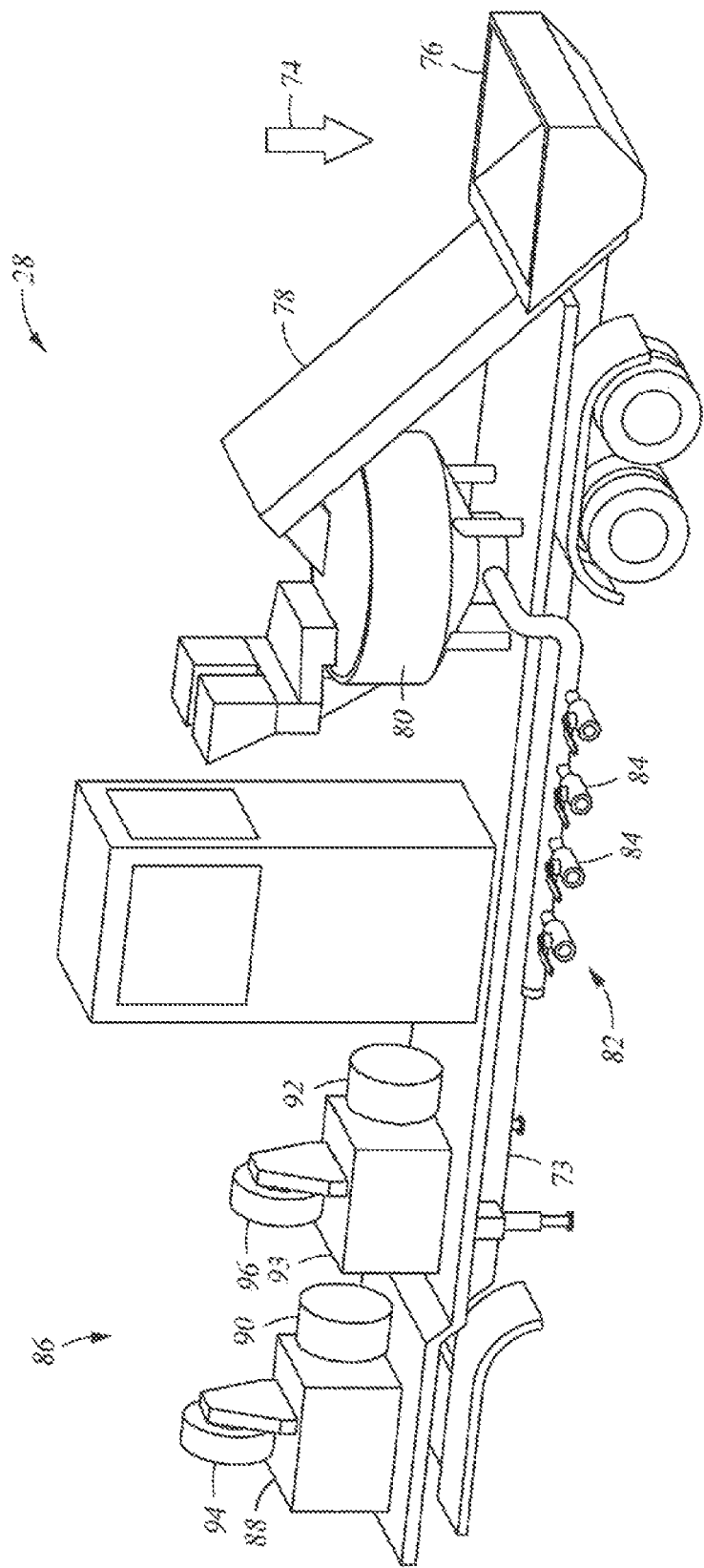
FIG. 2 is side perspective view of an example of a blender unit for use with the hydraulic fracturing system of FIG. 1.

Referring now to FIG. 2, shown in a side perspective view is an example of the blender 28 of FIG. 1. A trailer 73 is included with the blender 28, which provides a mounting surface and a way of transporting components of the blender 28. In the illustrated example, proppant 74 is shown being deposited into a hopper 76, which is a container for flowable material having side and lower walls, and open on its upper end for receiving the proppant 74. An elevator assembly 78 couples to one of the side walls of the hopper 76, and which is in communication with the inside of the hopper 76. An auger (not shown) within the elevator assembly 78 receives the proppant 74, and when rotated urges proppant up the elevator assembly 78 and away from hopper 76. A tub 80 is shown disposed beneath an end of elevator assembly 78 distal from hopper 76, and from which proppant 76 is discharged from auger. Within tub 80 the proppant 74 and fluid from hydration unit 18 (FIG. 1) are mixed together to form a slurry. Manifold piping 82 shown mounted to trailer 73 includes valves 84 and which selectively distributes the slurry to one or more fracturing pumps 36 (FIG. 1) for pressurization prior to being injected into a wellbore. A hydraulic system 86 is shown on trailer 73 distal from hopper 76, and which provides hydraulic fluid for powering various components within blender 28. In other embodiments, the blender or mixing unit can be skid mounted or truck mounted (body load).

Figure 3:
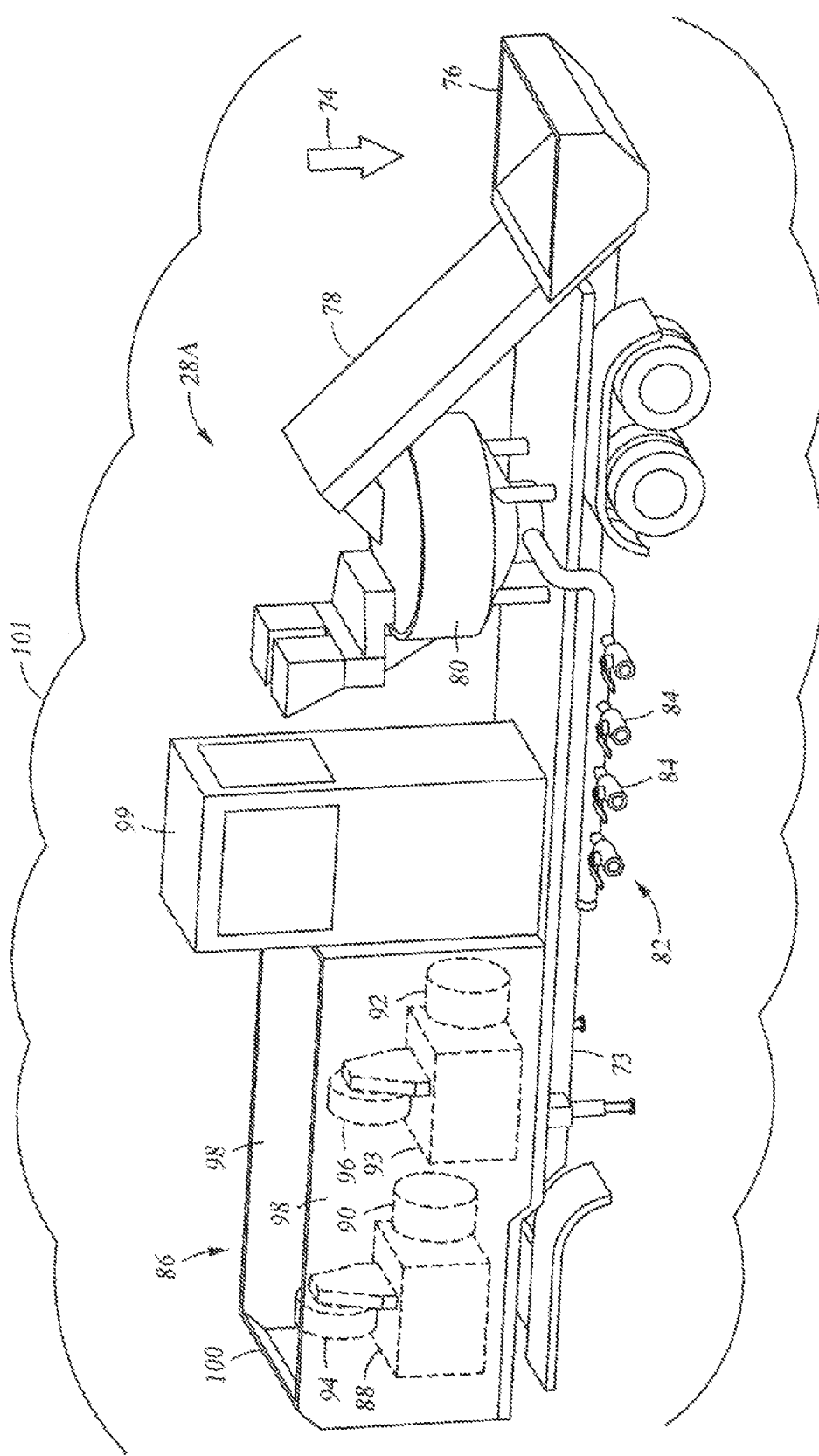
FIG. 3 is a perspective view of an example of the blender unit of FIG. 2 having noise reduction equipment.

FIG. 3 is a side perspective view of an alternate example of a blender unit 28A where a motor 88 is included with the hydraulic system 86; motor 88 powers a pump 90 which in turn pressurizes hydraulic fluid. In one example, pump 90 can include multiple hydraulic pumps that are driven by motor 88. Another pump 92 (shown in dashed outline) is shown mounted on trailer 73, and which pressurizes the slurry being discharged from the blender 28A. Schematically shown in dashed outline is motor 93 (shown in dashed outline), which is used for powering pump 92. Air cooling systems 94, 96 are shown disposed above motors 88, 93, and which provide cooling to motors 88, 93. Examples exists where ambient air, or any other type of fluid is used with the air cooling systems 94, 96. Panels 98 are shown mounted along lateral sides of trailer 73, and along a forward end of trailer 73 distal from a cab 99. Cab 99 houses operations personnel and controls for operating the blender 28A. Cab 99 cab have sound abatement material to protect the operations personnel in the cab 99. As shown, panels 98 extend away from an upper surface of trailer 73 in a generally perpendicular direction. An optional beveled section 100 is shown disposed on an upper portion of panel 98 on the forward end of trailer 73 Section 100 is canted at an angle generally oblique with trailer 73 and angled towards cab 99. Beveled section 100 serves to reduce drag when the blender 28A is being transported, especially at highway speeds where drag forces could become damaging to the panels 98. In one embodiment, panels 98 include one or more layers of a sound insulating material and a structural outer layer laminated together. In an example, the structural outer layer can withstand the fluid flow forces applied during transportation, or during high wind episodes. In an example, the structural outer layer can also withstand over 200 pounds of force or more to prevent a worker from falling off of the walkway. Examples of the structural outer layer include metal, such as iron or steel, and examples of the sound insulating material include a foam, such as a semi-rigid porous expanded polypropylene acoustical bead foam. Optionally, a visco-elastic damping compound could be applied to an inner surface of the structural outer layer and make up all or a portion of the insulating portion of the panels 98. As shown, the panels 98 extend above the components within the blender 28A that produce sound thereby redirecting noise upward and away from operations personnel who may be situated in an operations area 101 shown proximate the blender 28A. Redirecting the sound away from the operational zone necessarily reduces exposure of operational personnel to potentially harmful noise, thereby reducing risk of hearing damage and the need for hearing protection. Optionally, the walkway around the equipment may also have sound insulating material to prevent noise from escaping the bottom of the unit. Optionally, the enclosure could be a housing to also prevent noise from escaping vertically with service access doors and or windows on one or more sides/roof/floor of the housing.

Figure 4A:
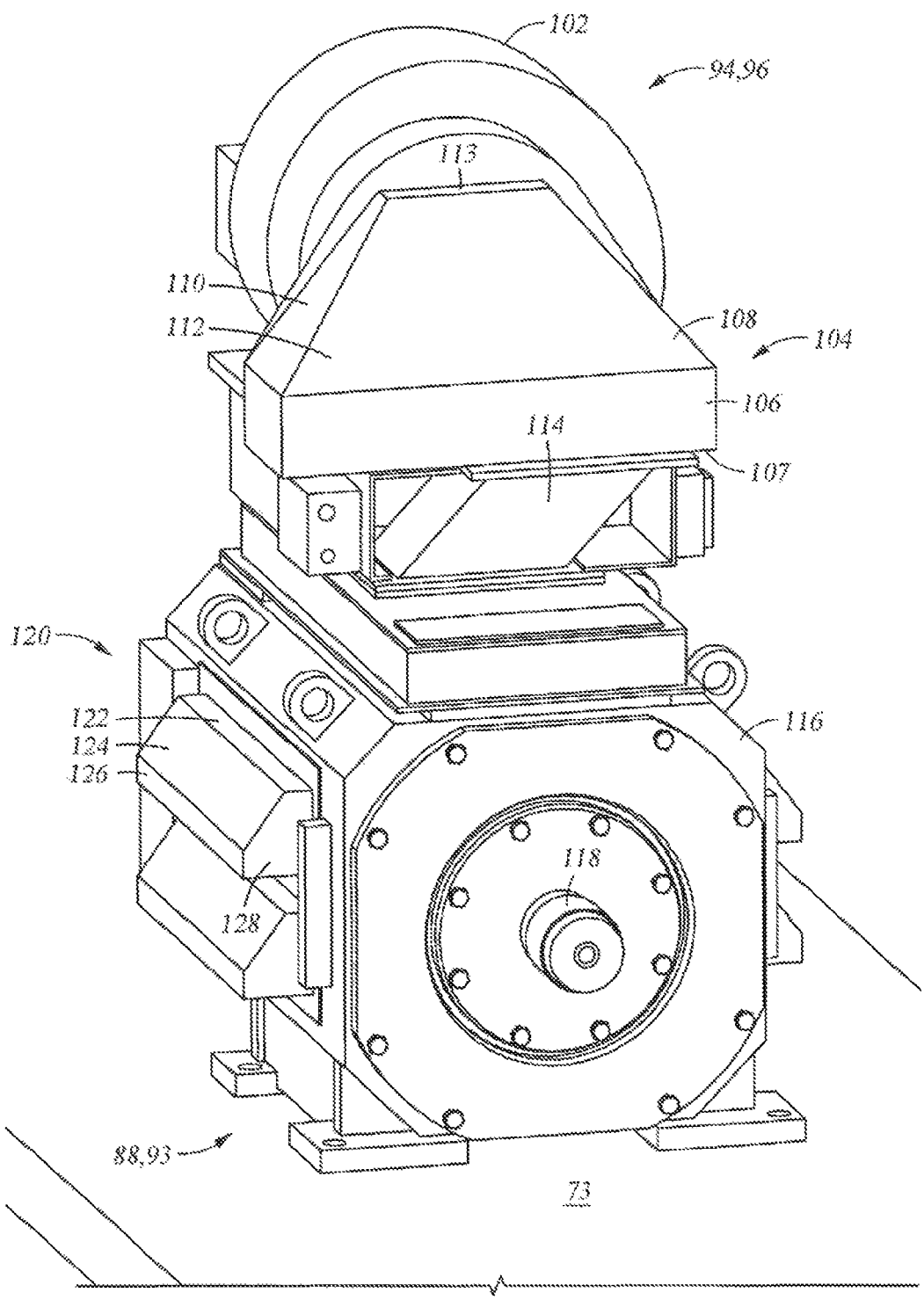
FIG. 4A is an end perspective view of an example of a motor for use with the hydraulic fracturing system of FIG. 1 and having an air cooling system.

Shown in an end perspective view in FIG. 4A is an example of reducing noise at the inlet and exit of the air cooling systems 94, 96. In the illustrated example, each air cooling system 94, 96 includes an air blower 102 having an intake shroud 104. Intake shroud 104 provides a fluid flow path of cooling fluid between ambient and to the inside of air blower 102. Intake shroud 104 includes a lower section 106 made up of planar side and end walls that are generally parallel with one another, and define an opening 107 in the shroud 104 through which ambient air flows to the air blower 102. Ambient air flows through the lower section 106 in a direction that is generally perpendicular with trailer 73; or any mounting surface on which the air blower 102 is supported, such as a truck, body load, or skid. An upper section 108 is shown coupled with an upper end of lower section 106, and which includes lateral side walls 110 that define opposing lateral sides of the intake shroud 104. Edges of the lateral side walls 110 distal from the air blower 102 are connected to one another by an end wall 112. The widths of the lateral side walls 110 reduce with distance away from the lower surface 106, so that the end wall 112 is set at an angle oblique with the side walls of the lower section 106. The side walls 110 also depend radially inward with distance away from the lower section 106, thus the cross sectional area inside of the intake shroud 104 gradually becomes smaller with distance from lower section 106. An upper wall 113 is shown extending between the lateral walls 110 and end wall 112. The lateral side walls 110 and end wall 112 are strategically formed so that air (or any other cooling fluid being directed to the air blower 102) flowing through the intake shroud 104 is gradually redirected to the air blower 102 rather than experiencing abrupt directional changes. The strategic redirection allows the cooling fluid flowing through the shroud 104 to remain more coherent, that in turn reduces formation of eddy currents within the shroud 104, thereby reducing noise. In one example the fluid flow path through the intake shroud 104 is generally curved and without edges, which further reduces eddy current formation and eliminates a direct escape path for noise. A further advantage is realized by orienting the lower section 106 with its opening 107 extending along a plane generally parallel with that of the trailer 73, so that any noise generated by air flowing into the opening 107 is directed towards the trailer 73 where it can be dissipated. In one optional embodiment, the intake shroud 104 is curved rather than having the mitered sections, thereby further reducing the possibility of forming eddy currents in the flow of air in the intake shroud 104.

Air being discharged from air blower 102 is directed through a duct 114 and to within a housing 116 covering motor 88, 93. The forced convection of the air provides cooling to the armature (not shown) and other components within the motor 88, 93 that become heated during operation of the motor 88, 93. A shaft 118 is shown projecting through a side wall of housing 116, and which when rotated drives pump 90, 92; or other rotating equipment. Side walls of housing 116 are provided with discharge louvers 120 that strategically guide air exiting the housing 116 along a path that is generally perpendicular to the upper surface of the trailer 73, and which is towards the trailer 73. Louvers 120 include an upper, middle, lower, and end walls 122, 124, 126, 128. Lower wall is generally perpendicular with a side wall of the housing 116 to which it is attached. A middle wall 124 attaches to an end of the upper wall 122 distal from housing 116, where middle wall 124 is generally oblique to upper wall 124. A lower wall 126 attaches to an end of middle wall 124 distal from upper wall 124, and which is disposed at an angle generally perpendicular with upper wall 122. End walls 128 are planar members having edges attached to side walls of housing 116, and whose outer periphery connects to opposing lateral edges of walls 122, 124, 126. End walls 128 are generally perpendicular with walls 122, 124, 126. An advantage of the strategic shape of the discharge louvers 120 is that cooling fluid being discharged from the housing 116 is redirected gradually from a path perpendicular with side walls of housing 116 to a path generally parallel with side walls of housing 116. Gradually redirecting the cooling fluid exiting the housing 116 allows the cooling fluid being discharged to remain generally coherent and without producing turbulence that could generate noise. Further, directing the discharge cooling fluid towards the trailer 73 better attenuates the noise associated with the discharge cooling fluid than if the cooling fluid were discharged upwards or laterally. Moreover, noise generated by the discharged cooling fluid is attenuated by redirecting it rather than simply discharging the cooling fluid along a straight path. Thus an advantage exists by redirecting substantially all of the discharged cooling fluid in the manner illustrated. Additionally, noise absorbing material can be provided along inner surfaces of the discharge louver 120. Examples of such noise absorbing material include foam, lead foam, and polypropylene foam. Optionally, the discharge louver is curved along its length instead of having the mitered sections illustrated.

Figure 4B:
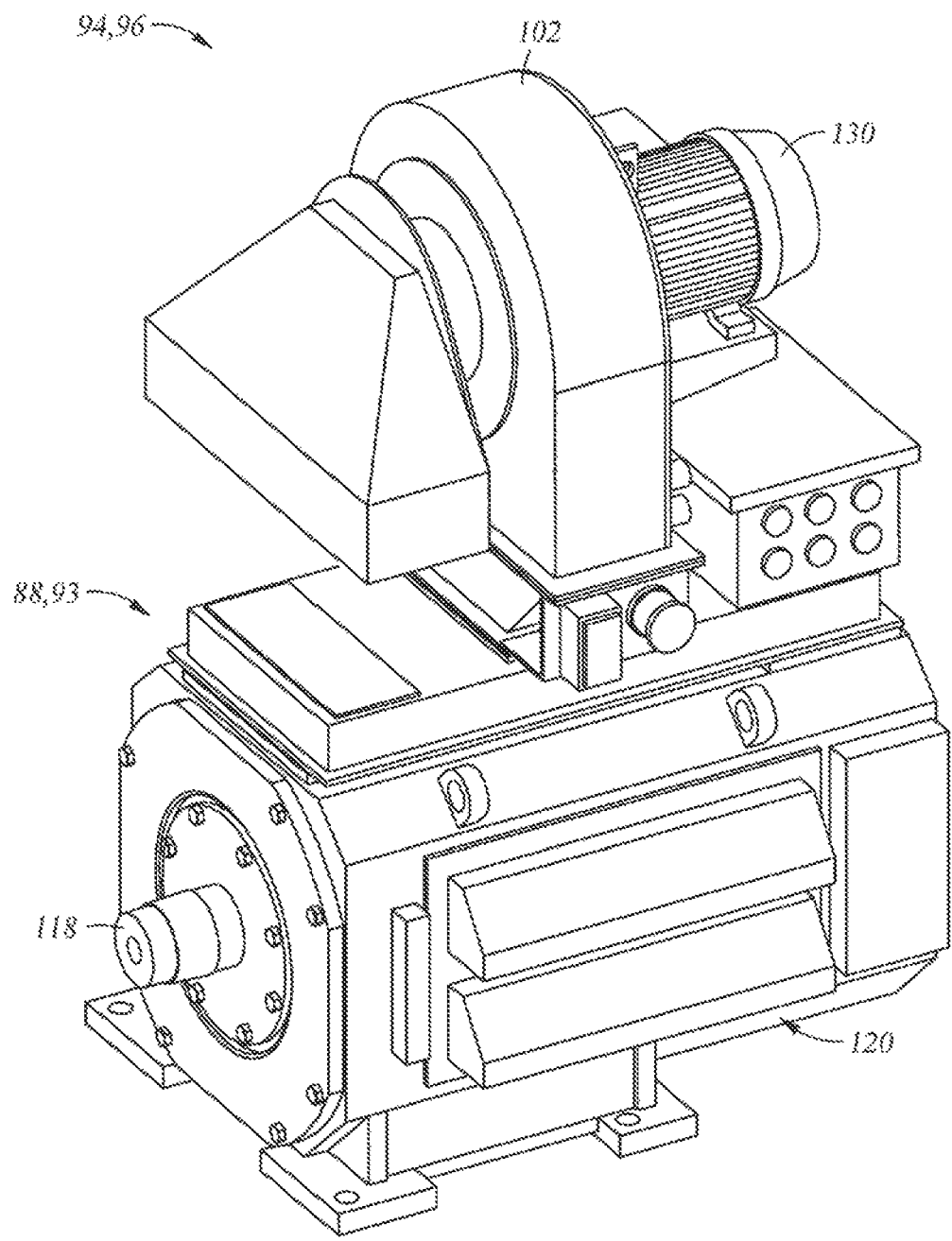
FIG. 4B is a side perspective view of an example of the motor of FIG. 4A.
Figure 4C:
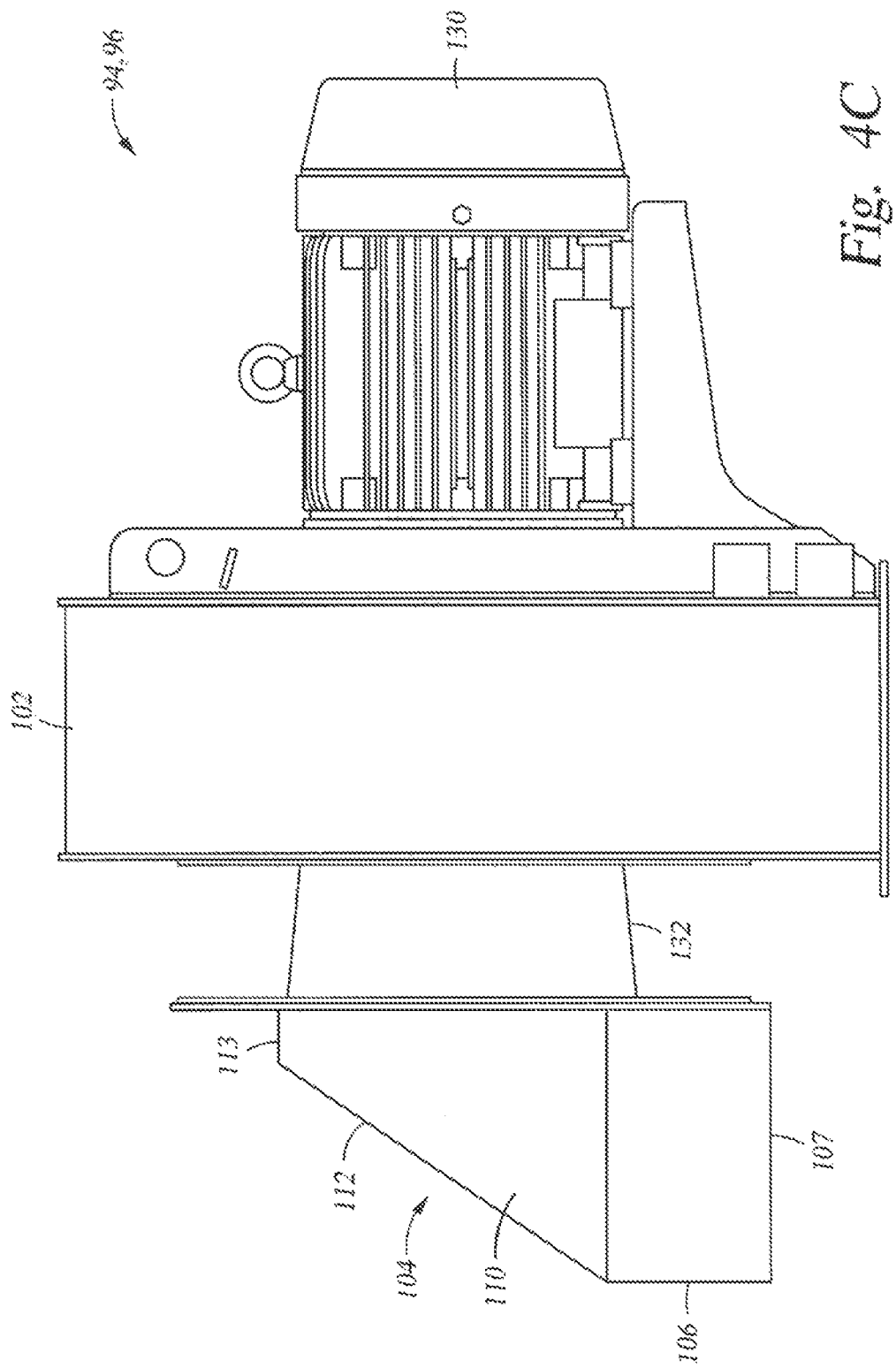
FIG. 4C is a side view of an example of an air cooler for use with the motor of FIG. 4A.

Another example of the motor 88, 93 with noise reduction equipment is shown in side perspective view in FIG. 4B. Here, a motor 130 is shown coupled with air blower 102 for driving a fan blade (not shown) disposed within air blower 102. In one example, the motor is an electric motor, 600 V, and three phase. Referring now to FIG. 4C, a side view of the air cooling system 94, 96 is shown, and wherein a connector duct 132 is depicted attached to a side of the intake shroud 104 opposite from the end wall 112 Connector duct 132 provides fluid communication between shroud 104 and housing of air blower 102, and along a path generally perpendicular to a path the fluid travels when entering the opening 107 of the shroud 104. Thus the intake to the air cooling system 94, 96 also attenuates noise in the fluid by purposefully redirecting and changing the path of the fluid flowing to the air blower 102.

Figure 4D:
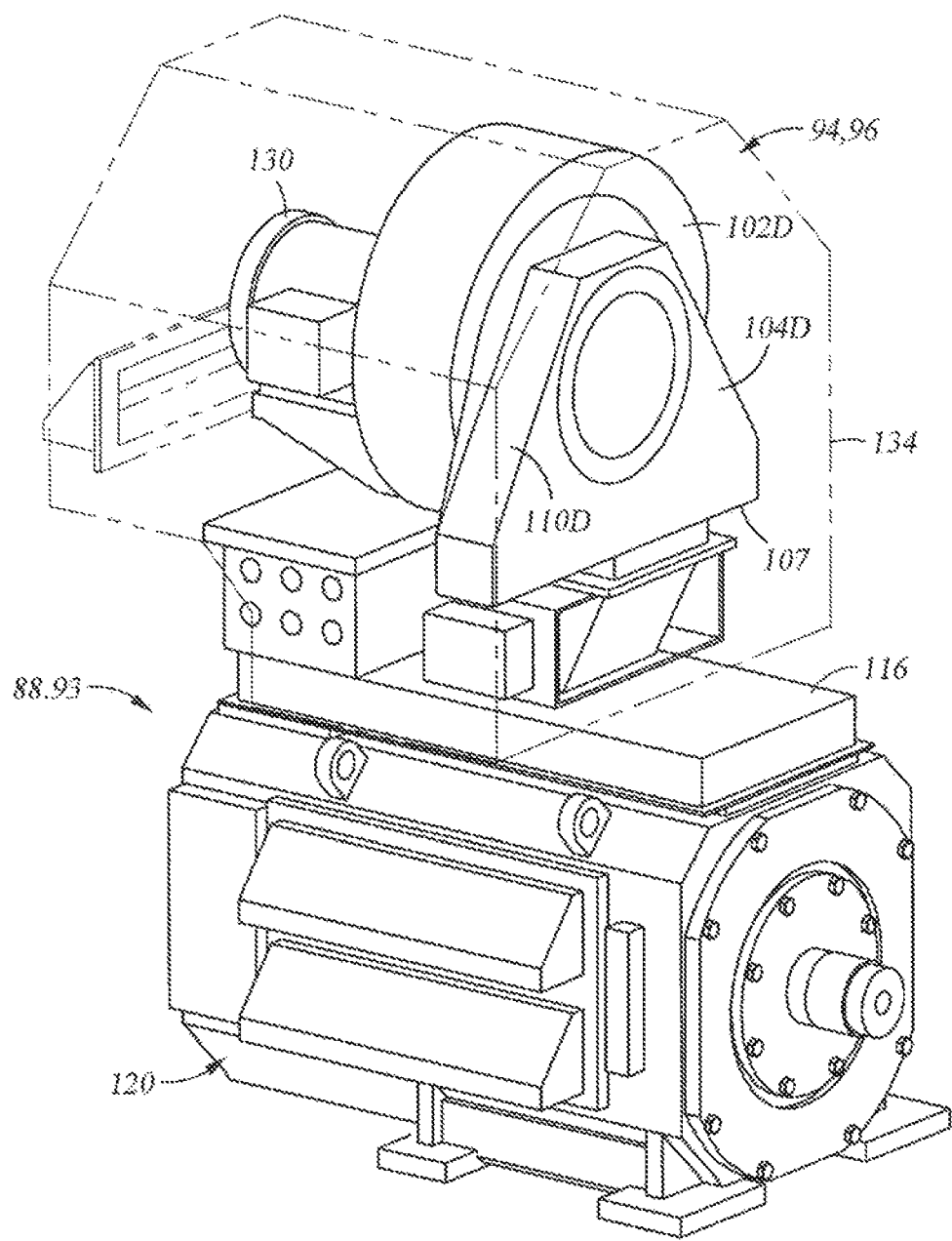
FIGS. 4D and 4E are a side perspective and side views of an example of the motor of FIG. 4A having a noise suppression enclosure.

Referring now to FIG. 4D, shown in a perspective view is an example of a blower cover 134 that is disposed over the air blower 102D. Blower cover 134 has side and lateral end walls that are shown spaced laterally outward from the periphery of the air blower 102D and motor 130. Thus cover 134 defines a barrier between air blower 102D and motor 130 that can deflect and/or attenuate noise generated by motor 130 and/or air blower 102D. Side walls of the cover 134 terminate between the opening 107 and housing 116. The cover 134 includes a bottom wall that extends inward from the lower terminal ends of the side walls and blocks downward noise transmission from the air blower 102D. Noise abatement material, such as the foams provided above, can be incorporated with the cover 134. Although shown as having lateral side walls 110D with constant widths, the lateral side walls 110D can taper like the lateral side walls 110 of FIGS. 4A-C.

Figure 4E:
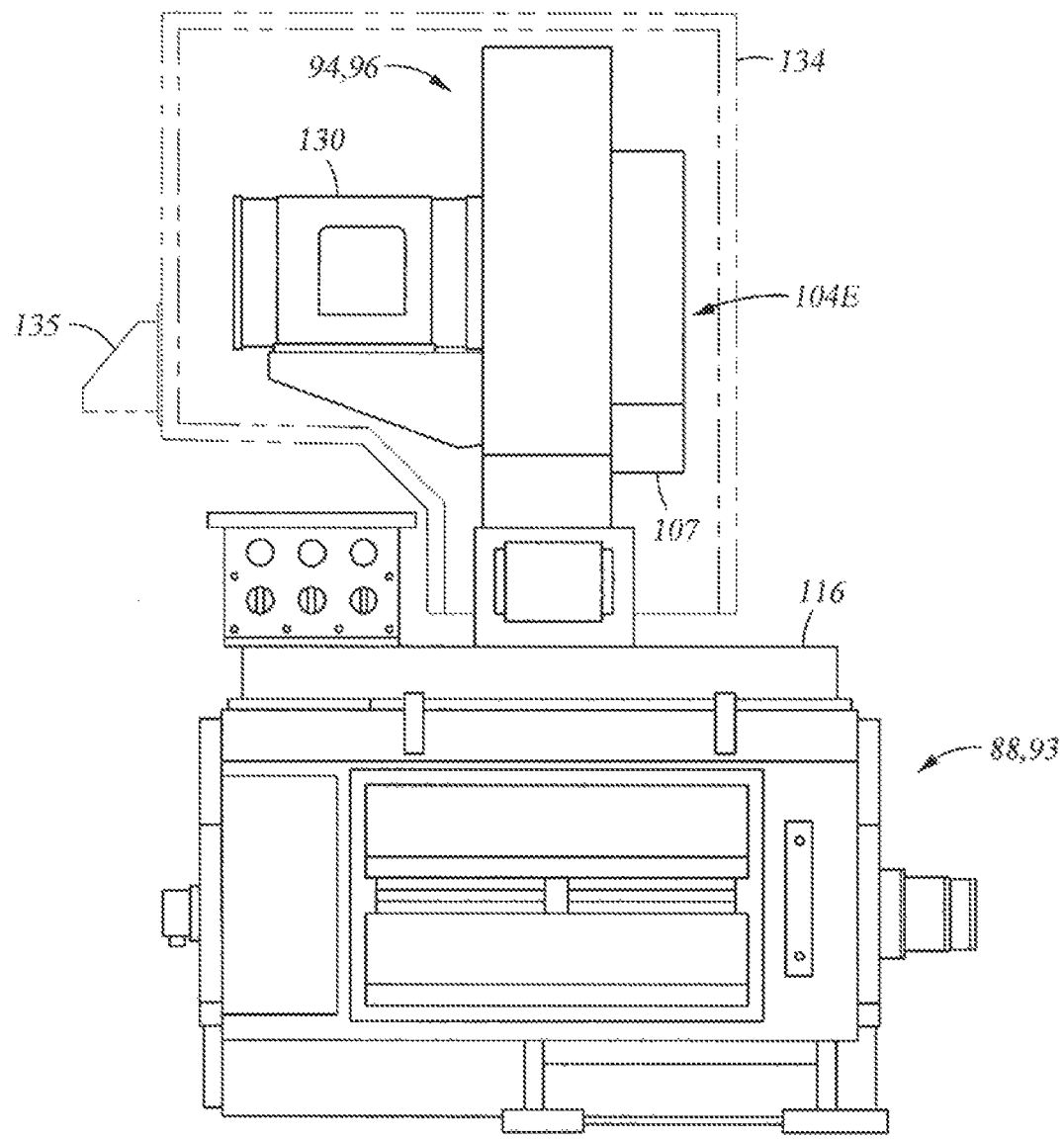

FIG. 4E shows in a side view an example of the blower cover 134, where a cover inlet 135 is formed on a rearward vertical wall of the blower cover 134, and which is distal from the opening 107 to the inlet shroud 104E. Cover inlet 135 includes a hood like portion with an entrance facing downward, and exit facing inside of the blower cover 134, so that cooling fluid, such as air, flowing through the cover inlet 135 experiences a direction change of at least around 90°. In an example, the inner surface of the cover inlet 135 is profiled so that the cooling fluid flowing through the cover inlet 135 follows a generally curved path. Further, the cover inlet 135 can be spaced at an elevation the same as or different from that of opening 107. In an embodiment, disposing the cover inlet 135 at a different elevation than opening forces the cooling fluid to alter its path. When the cover inlet and the blower inlet are on opposite sides, sound waves are prevented from having a direct line of escape. Forming the cover inlet 135 distal from opening 107 and at a different elevation introduces additional directional changes for fluid making its way to opening 107 thereby generating additional attenuation for any noise that may be generated by the flow of the fluid. The cover inlet 135 optionally includes sound abatement material.

Figure 5A:
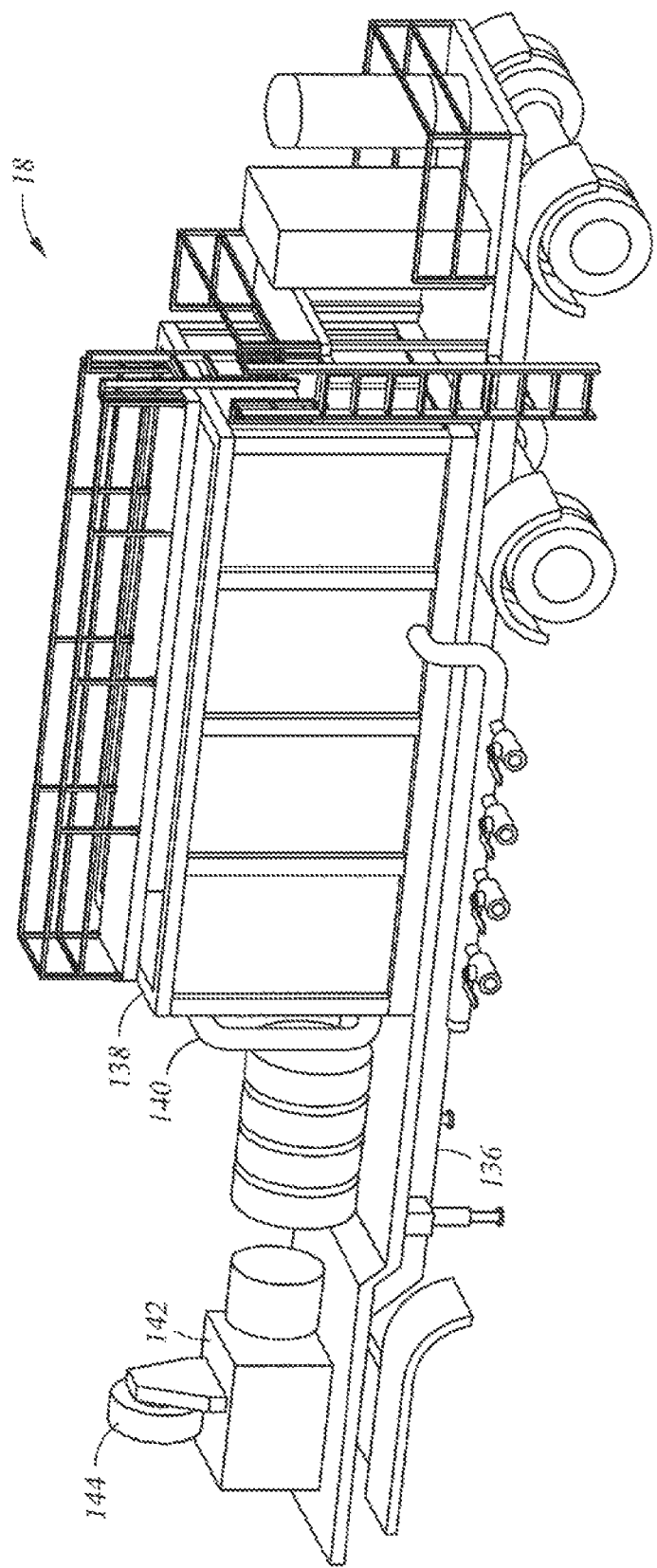
FIG. 5A is a side perspective view of an example of a hydration unit for use with the hydraulic fracturing system of FIG. 1.

Shown in a side perspective view in FIG. 5A is an example of a hydration unit 18 for use with the hydraulic fracturing system 10 of FIG. 1. Here a trailer 136 is provided for mounting the components of the hydration unit 18, and for transporting the hydration unit 18. A mixing tank 138 on the trailer 136 selectively receives fluid from fluid source 20

Figure 5B:
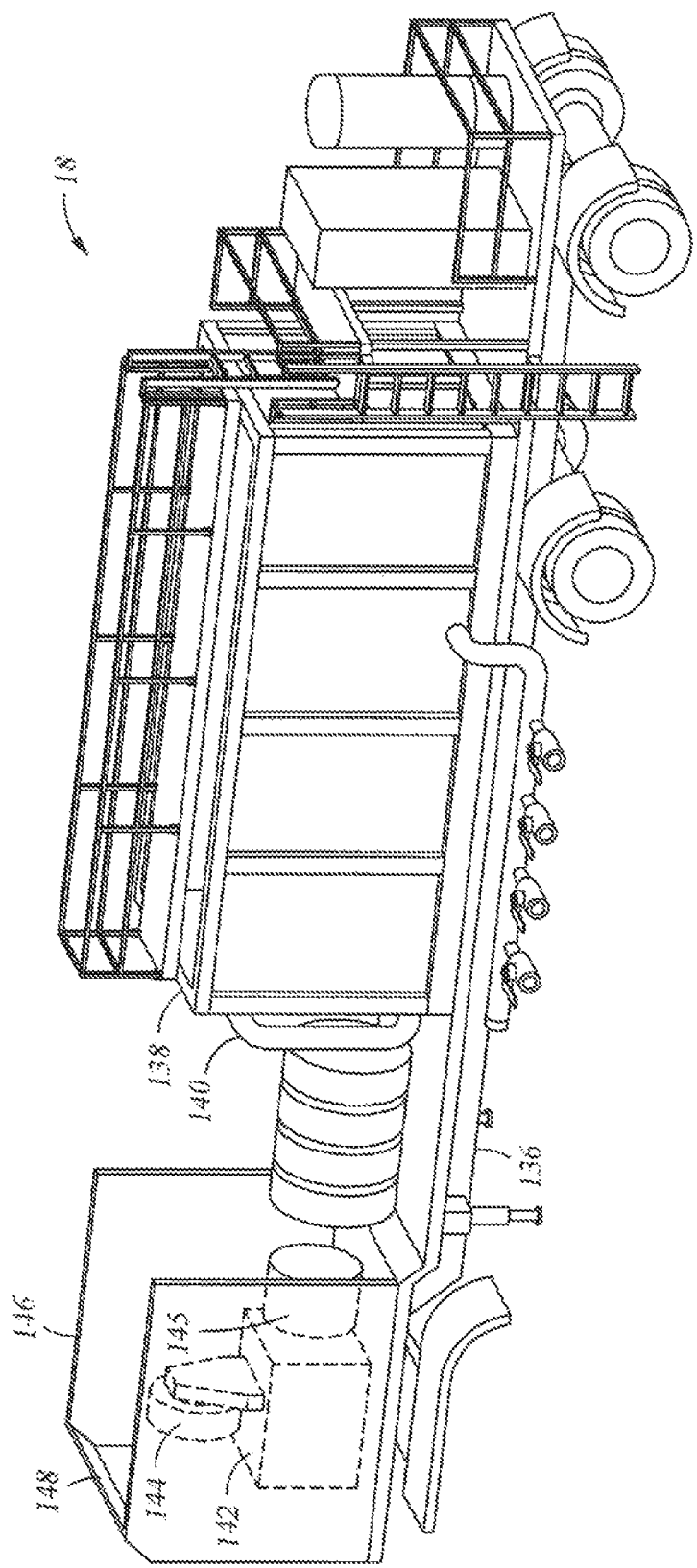
FIG. 5B is a side perspective view of an example of a hydration unit for use with the hydraulic fracturing system of FIG. 1 having noise reduction equipment.

(FIG. 1). Connected to tank 138 is a piping circuit 140 for selectively distributing fluid from tank 138 to blender 28 (FIG. 1). In one example, fluid hoses connect the hydration unit and the blender. Chemicals from the additive source 24 (FIG. 1) can be added into the tub 80 of the blender 28, and/or the mixing tank 138 of the hydration unit 18. A motor 142 is shown on trailer 136 along with an air cooling system 144 for cooling the motor 142. Shown in a side perspective view in FIG. 51, is an example of a hydration unit 18A having noise abatement equipment. More specifically, panels 146 are provided on the outer periphery of the trailer 136 and between noise producing equipment provided with the hydration unit 18A and spaces adjacent to the trailer 136. In the example, the panels 146 extend a distance above the air cooling system 144 of FIG. 5B so that any noise generated therein is redirected in a generally upward direction. Further shown is a pump 145 (where pump 145 can include a multiplicity of pumps) that is connected to and driven by motor 142. Like the blender unit of FIG. 3, a beveled portion 148 is provided on an end of the sound abatement panels 146. Moreover, the panels 146 of FIG. 5B can be substantially the same as the panels 98 of FIG. 3. Similarly, the air cooling system 144 and motor 142 of FIG. 5B can have substantially the same noise attenuation devices illustrated in FIGS. 4A-4D and described above.

FIG. 6 shows in a side perspective view and example of the turbine 44, generator 50, and shaft 52, that make up the turbine generator 53, are disposed in a housing 150. In the illustrated example the housing 150 is formed from panels 152 having noise abatement or noise attenuation material, such as the foam or types of foam described above. Panels 152 can also include an outer surface having structural material, such as metal or composite for supporting the noise attenuation material. The enclosure formed by the housing 150 is accessible via one or more doors 154 shown mounted to the housing 150. The doors 154 can be formed from the same material as the panels 152, or can be a panel 152 tailored to fit within a door frame 156 set in the housing 150. Referring now to FIG. 6A, a portion of the door frame 156 is shown in a sectional view, and where door frame 156 includes a pair of U-shaped frame sections 158, 160 with their respective open spaces facing one another that form a cavity 161 within the sections 158,160. Insulation 162 is shown disposed within cavity 161, and that can optionally extend fully into the open spaces in each of the sections 158, 160. Welds 164, 166 may be used for attaching the sections 158, 160 together. Referring back to FIG. 6, a skirt 168 is shown mounted to an outer surface of housing 150 and a trailer (not shown) on which the housing and turbine generator 53 are mounted. In the illustrated example, the skirt 168 is made of a sound proofing material, and can be subdivided into multiple sections 170 along the periphery of the trailer and housing 150. As shown, a portion of skirt 168 lies on the surface on which trailer is supported. Fasteners 172, which can be hooks, bolts, rods, hook and loop fasteners, and the like, attach the sections 170 to the trailer and housing 150. Seams 174 illustrate one manner of how adjacent sections 170 can be adjoined to one another. An annular discharge stack 176 is shown on the trailer and outside of the housing 150, and which provides a conduit for combustion gases exiting the turbine 44 (FIG. 1) of the turbine generator 53. Discharge stack 176 mounts on a cylindrically shaped silencer 177, in which the turbine discharge gases are redirected from a generally horizontal path to a generally vertical one, and into the stack 176. Noise insulation 178 is shown provided on the outer surfaces of the stack 176 and silencer 177, and which abates noise caused by the discharge gases flowing through the silencer 177 and stack 176. In one example, noise abatement material can be attached to the inner floor of the turbine generator enclosure and/or the outside underside of the housing 130. In another example, noise abatement material can be attached to the inner ceiling and/or the outer roof of the housing 150. In another example, the turbine generator 53 can be trailer mounted, skid mounted, or truck mounted (body load).

Figure 7:
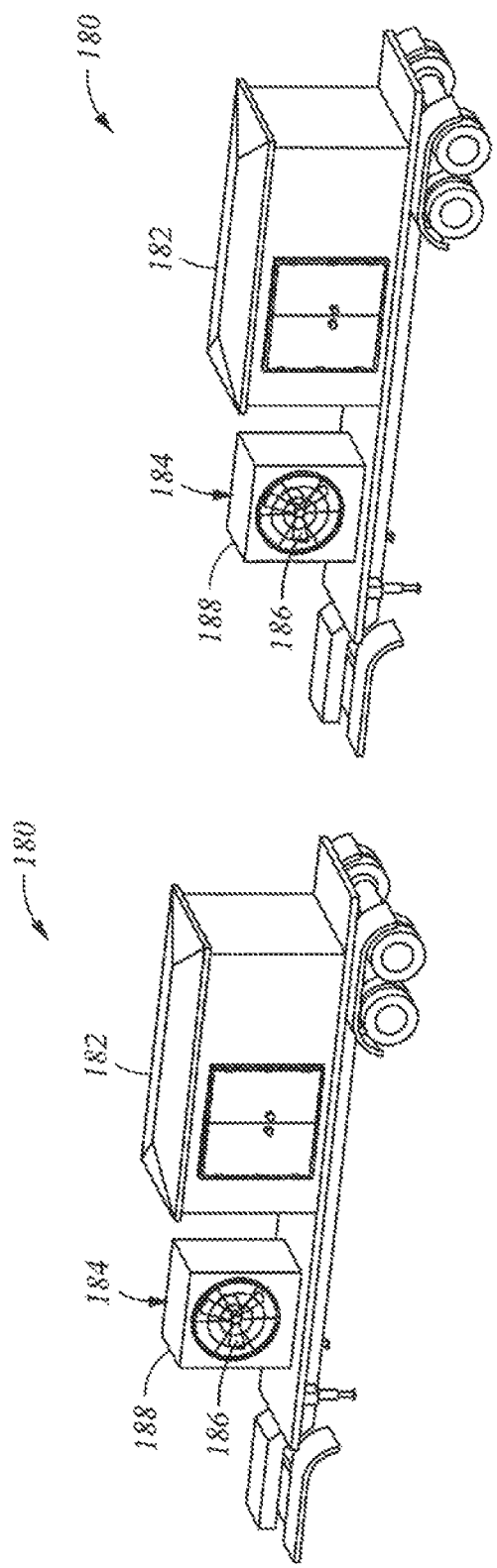
FIG. 7 is a side view of an example of compression unit having noise reduction equipment.

Examples of optional compressor units 180 are shown in a side perspective view in FIG. 7. The compressor units 180 can be between the fuel source 146 and turbine 44 of FIG. 1, and used to pressurize the combustible fuel to above a threshold pressure so that the discharge of the turbine 44 is at or above a designated pressure. The compressor units 180 include a housing 182 that forms an enclosure for a compressor (not shown), where the housing 182 includes noise insulation material. A cooling system 184 is provided with each compressor unit 180 for cooling gas compressed by the compressors. The cooling systems 184 each include a fan 186 that is configured to draw cooling air inward into an enclosure 188, in which piping for transmitting the compressed gas is routed. The air drawn in by the fans 186 is discharged from an opening on an upper surface of the enclosures 188. Drawing air inward through the fan 186 and into the enclosure 188 in the fashion described generates less sound than by drawing air in through an opening and discharging it from the enclosure 188 through the fan 186. In an example, the compressor is driven by a motor, where the motor is energized with electricity generated by turbine generator 53 of FIG. 1. In one non-limiting example of operation, the electric compressor receives power from a black start diesel generator until a transfer switch can be utilized to switch over to turbine power. Optionally the motor can be powered by internal combustion, and can use natural gas from a wellhead. In one example, a transformer (not shown) converts electricity from 13.8 kV at the turbine generator to a voltage for use by the motor. Example voltages for use by the motor include 600 V and 480 V. In this embodiment, this transformer and electrical lines to and from transformer are included in the micro-grid 54 (FIG. 1).

Figure 8:
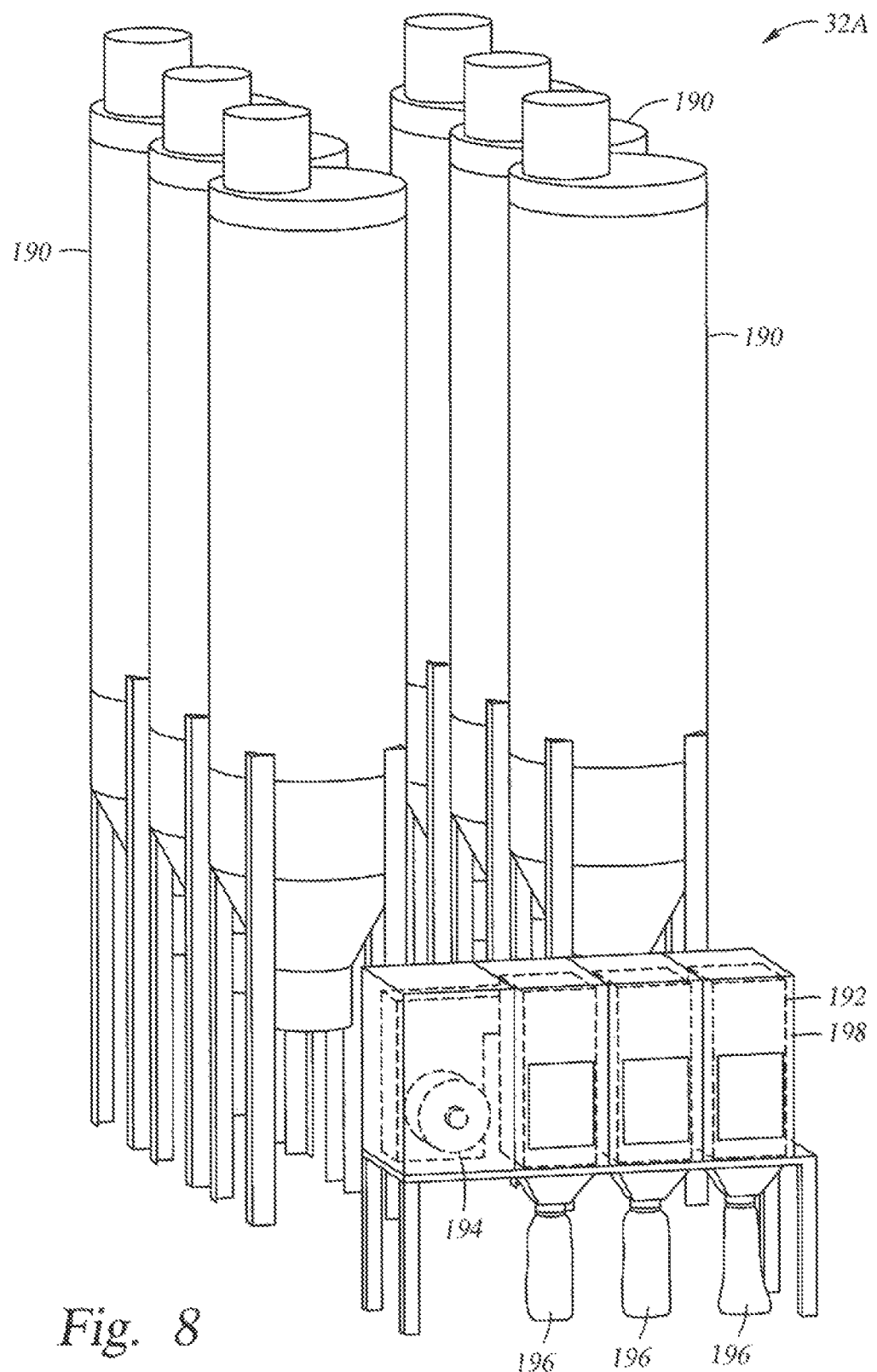
FIG. 8 is a side perspective view of an example of a proppant storage unit for use with the hydraulic fracturing unit of FIG. 1.

FIG. 8 shows in a side perspective view an example of a proppant source 32A having noise reduction equipment. The proppant source 32A includes rows of silos 190, that have a generally cylindrically shaped upper portion and conical lower portion. Proppant or sand within the silos 190 can be deposited from the conical lower portions onto conveyers (not shown) that extend between the rows of silos 190. Particulate matter is released from the proppant or sand during the transfer from the silos 190 to the conveyer, and which can become airborne. Filters 192 and a vacuum system 194 define a dust recovery system and are provided to capture the particulate matter from the air. Inside the filters 192 the airborne particles are separated from the air, and the collected particles can be dropped into receptacles 196 disposed below the filters 192. Panels 198, which are shown in phantom view, are provided around the filters 192 and vacuum system 194. Panels 198 block and redirect upward noise produced by the vacuum system 194 and within filter 192. The proppant source 32A is not limited to the silos as illustrated, but can include any type of container for storing solids to be introduced into a fluid being injected into a wellbore; such as for example, sand boxes, or containers referred to as sand kings. Noise abatement curtains or walls can optionally be installed on the sand conveyer skid to reduce noise. In another example, noise abatement curtains or walls can be installed on the sand vacuum system to reduce noise. In examples when a pneumatic sand truck is utilized to deliver proppant to a well site, an air compressor can be used to blow sand off into the sand storage units; which typically generates a high level of noise. In one example, and electric unit that is enclosed can be utilized to blow the sane instead of an air compressor, which can reduce noise.

Figure 9A:
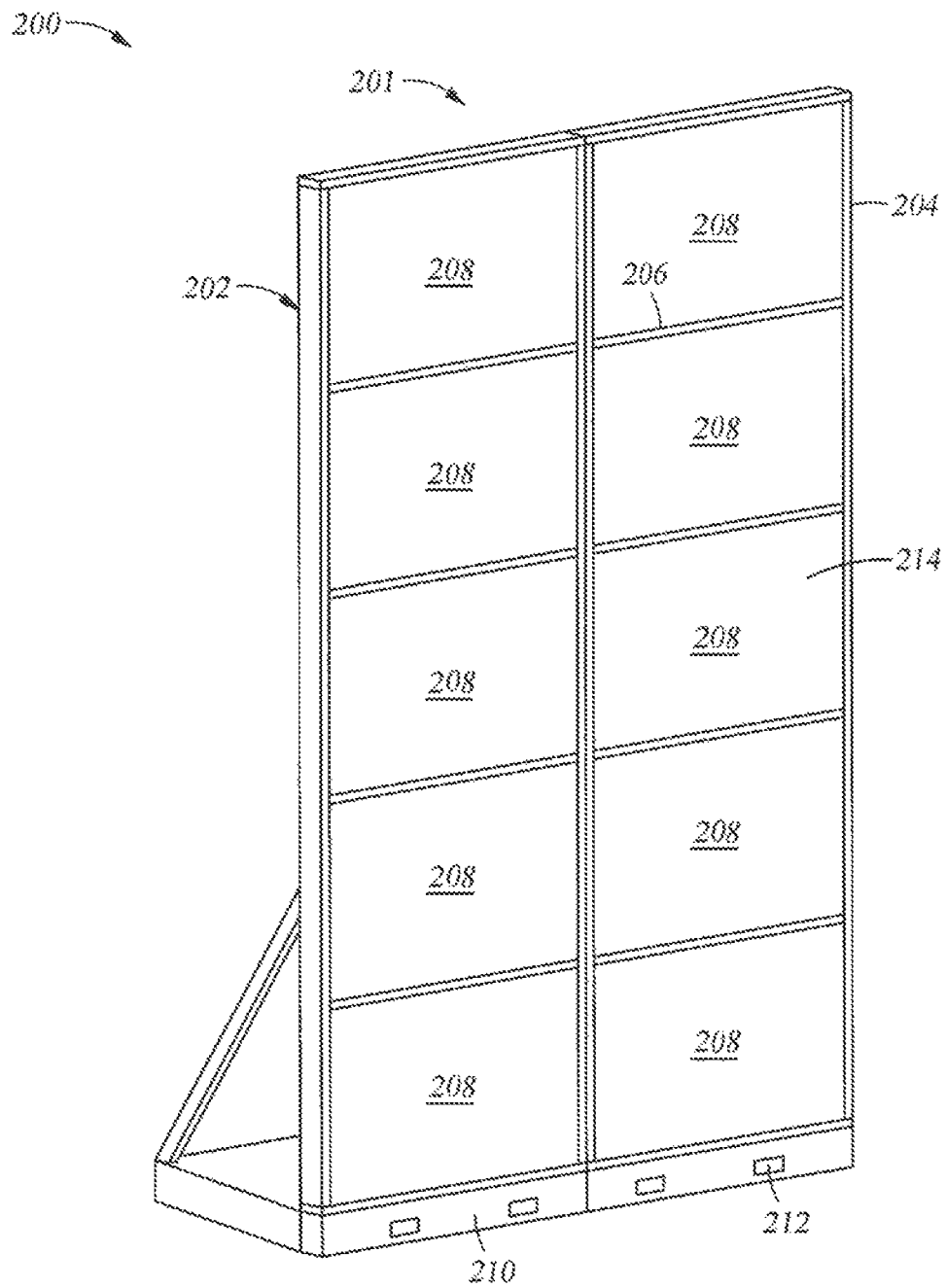
FIGS. 9A and 9B front and rear perspective views of examples of sound walls.
Figure 9B:
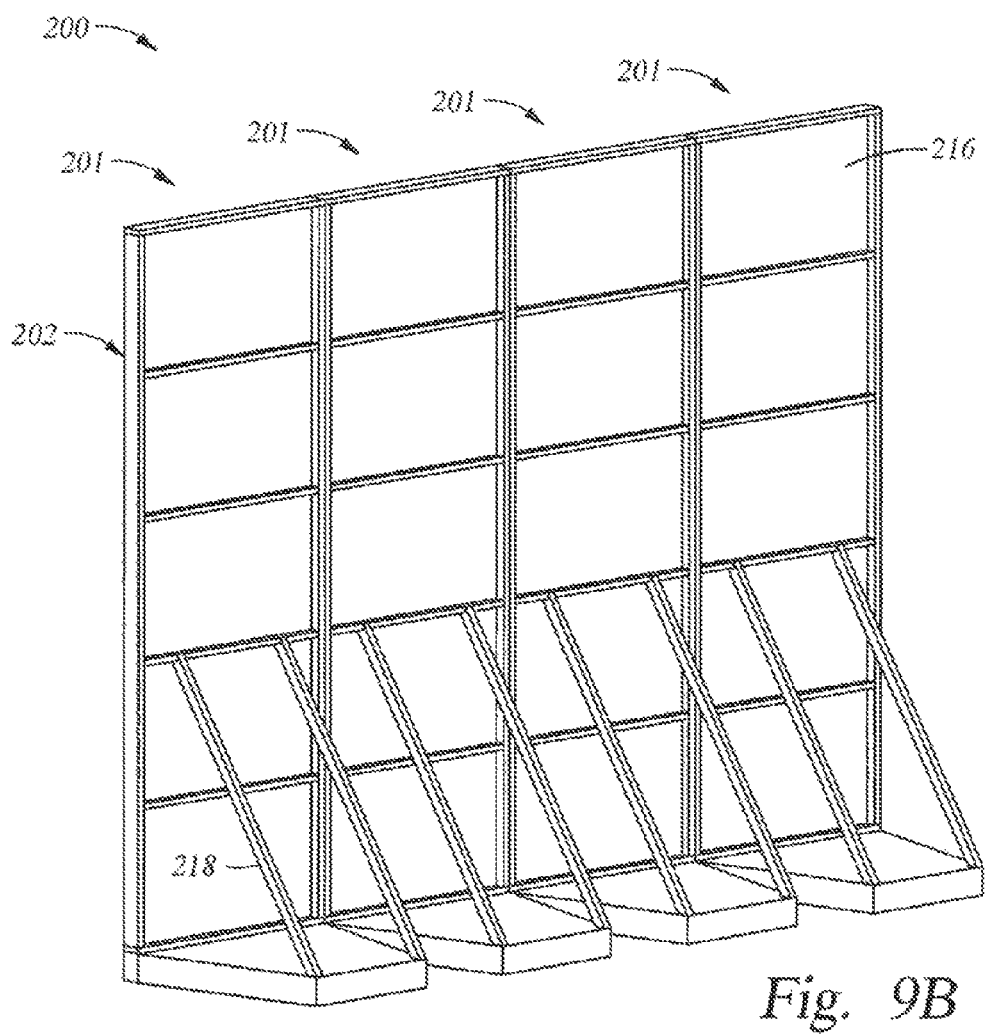

Shown in perspective view in FIG. 9A is an example of a sound wall 200 made up of wall sections 201, where the sections are is modular, and can be moved adjacent operating equipment for reducing noise generated by the equipment. The wall section 201 includes a frame 202 having vertical and horizontal beams 204, 206 coupled to one another, and wall panels 208 between adjacent ones of the beams 204, 206. The wall panels 208 include noise abatement material that can deflect, absorb, and or attenuate noise. A lower end of frame 202 mounts to a base 210, which is generally planar and is set horizontal with grade. Openings 212 are formed in an end of the base 210, and which can selectively receive tongs of a forklift, so that the sound walls 200 can be selectively moved or arranged in a designated location and/or orientation. In the illustrated example, the frame 202 is mounted along a lateral edge of base 210. Embodiments exist wherein the frame 202 is set along any portion of base 210. A free end is formed on an end of base 210 distal from its connection to frame 202. As shown, surfaces of wall sections 208 facing away from the free end of the base 210 define a front side 214. Referring now to FIG. 9B, sound wall 200 includes additional wall sections 201 and are oriented adjacent operating equipment so that the front side 214 faces the equipment, and a rear side 216 faces away from the equipment. Elongated struts extend between the base 210 and frame 202 to support the frame 202 in place.

Figure 9C:
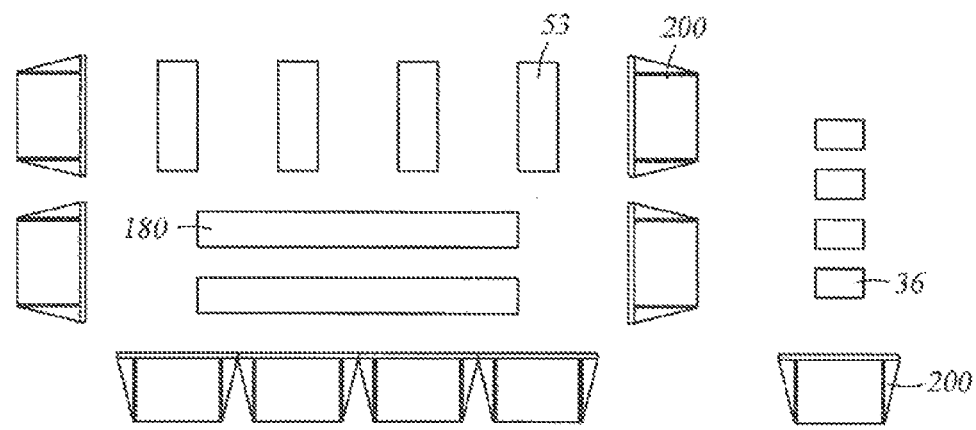
FIG. 9C is a schematic plot plan of the sound walls of FIGS. 9A and 9B disposed adjacent rotating machinery.

Shown schematically in FIG. 9C is an example of a plot plan having turbine generators 53 arranged parallel with one another, and compressor units 180 set in rows adjacent ends of the turbine generators 53. Here sound walls are shown extending along a lateral side of the turbine generators 53 and along a side of the compressor units 180 opposite from the turbine generators 53. Also shown are pumps 36 arranged in parallel to form a row, and a sound wall 200 formed along an end of the row of pumps 36. Strategic placement of the sound walls 200 abates noise in an operational area adjacent the turbine generators 53 and pumps 36 and lowers the risk of excessive noise to operations personnel, and without fully enclosing the areas having the turbine generators 53 and pumps 36 with sound walls 200. In one example the sound walls 200 are disposed at around 1 foot from the equipment producing the sound to be abated, up to 3 feet from the equipment producing the sound to be abated, or any distance there between.

Figure 10:
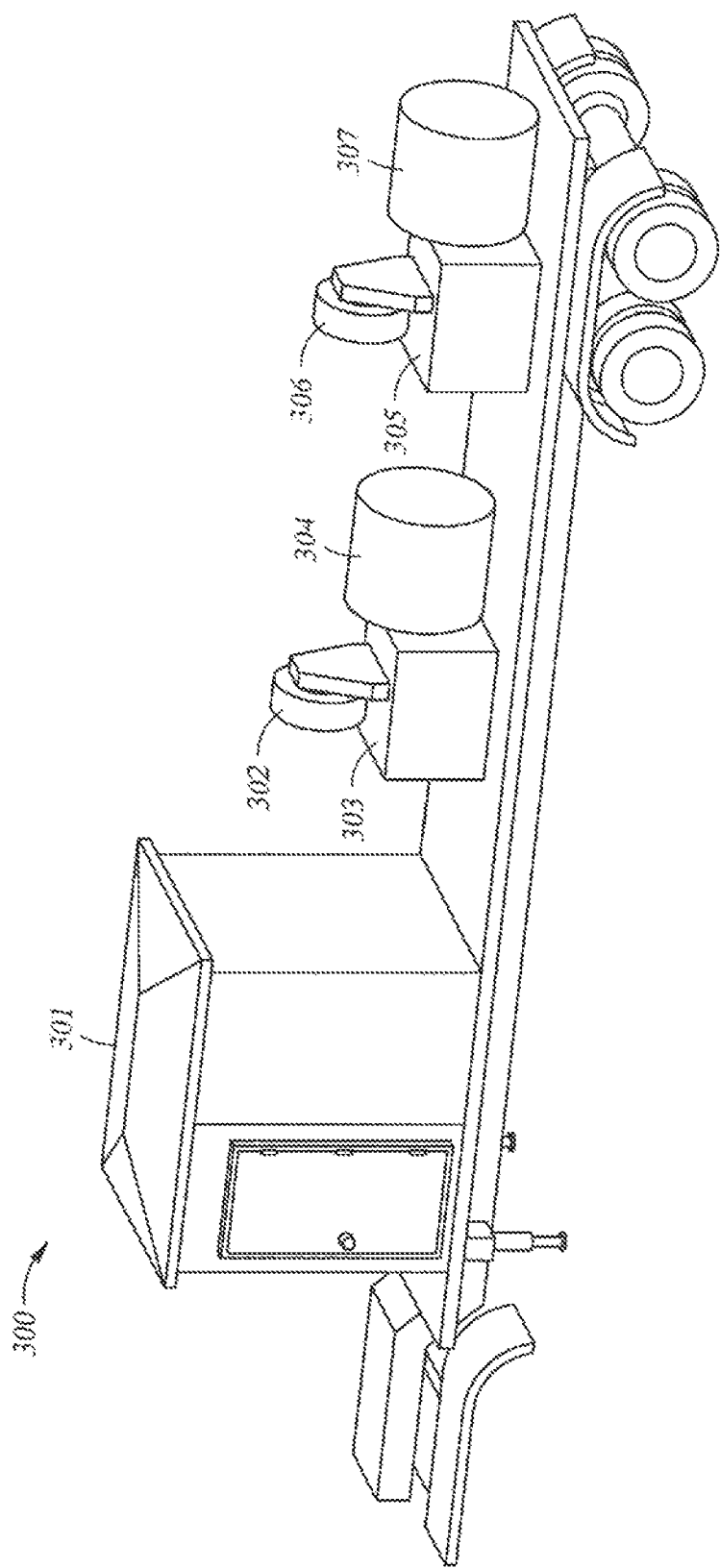
FIG. 10 is a side perspective view of an example of a system for pumping fracturing fluid.

Referring now to FIG. 10, shown in a side perspective view is an example of the pump 36 of FIG. 1. A frac pump unit 300 is capable of pumping inhibited acid and other proppant laden stimulation fluids. It can be operated locally or remotely from a control unit. In one example, a dual electric frac pump unit has two electric motors 303,305 that are each capable of delivering 1750 BHP or approximately 1520 HHP based on efficiency losses and varying conditions at time of operations. In another example, only one electric motor and frac pump are on a trailer. In one example a VFD system is installed on the pump trailer inside of an enclosure 300. In another example the VFD system can be installed on a separate unit and connected by cables to the frac pump unit. In one example, the motors 303,305 and air blowers 302,303 are as described earlier with noise abatement features and as shown in FIGS. 4A-4E. In another example, the air blower is also enclosed as shown on FIGS. 4D,4E. In addition, vertical walls (not shown) may be mounted to the trailer with noise abatement material to further reduce noise levels. These vertical noise abatement walls may have access panels for serviceability of the equipment and may in some examples be completely removable for service access.

Many hydraulic fracturing well sites require noisy diesel generated light plants for providing light to the site as well as access to electrical power. The micro-grid 54 (FIG. 1) can also supply power for an electrical version of these light plants and provide third party access to electrical power without the need for diesel engine generators. In addition, telescoping lights can be incorporated into the power generation, power distribution, and stimulation equipment to provide light to the site. In one example, these lights are LED, and can be extended on a mast as well as rotate to point the light where needed. In another example, the lights can be independently turned on and off as needed. In another example, they can be dimmed as needed. These embodiments allow for the light to be directed when it is needed instead of shining away from the pad and potentially causing light disturbances to neighboring communities and/or wildlife.

Figure 11:
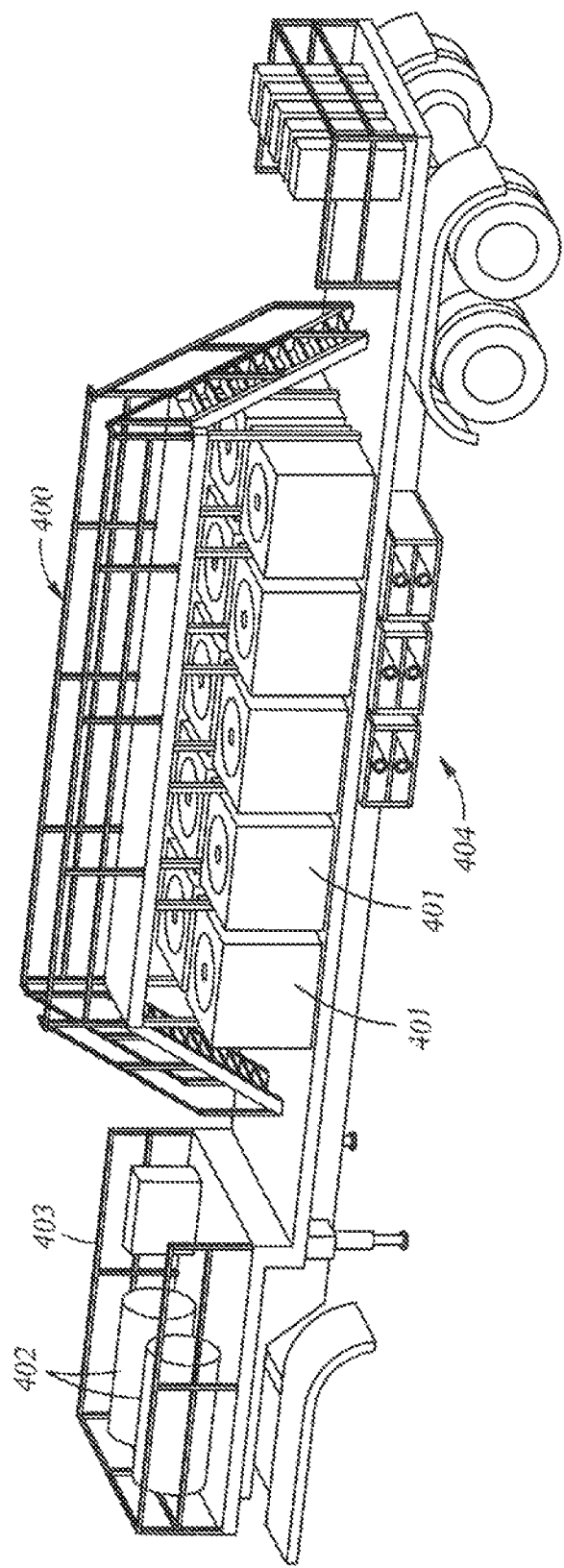
FIG. 11 is an overhead perspective view of an example of a chemical additive system mounted on a trailer.

FIG. 11 shows one example of a separate chemical additive unit. The unit is capable of transporting and pumping liquid chemical additives in harsh oilfield environments. The unit is operated from either a unit-mounted control console or a mobile computerized data acquisition and control unit. An elevated walkway 400 runs lengthwise above the liquid chemical tanks and allows the operator to inventory tank volumes. The walkway is equipped with fold-down handrails and a staircase for access on each end. It is equipped with tanks 401 and pumping systems 404 for liquid chemical additive treatments such as polymer, surfactant, cross-linker, and breaker tanks. In one example, hydraulic power for the unit can be provided by one or more diesel engines 402. In one example, hydraulic power for the unit can be provided by an electric motor as shown in FIGS. 4A-4E. In one example, a motor and an air blowers are as described earlier with noise abatement features and as shown in FIGS. 4A-4E. In another example, the air blower is also enclosed as shown on FIGS. 4D,4E. In addition, vertical walls may be mounted to the trailer with noise abatement material to further reduce noise levels, similar to how is shown on FIG. 51 and replace the handrails 403. These vertical noise abatement walls may have access panels for serviceability of the equipment and may in some examples be completely removable for service access.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the pieces of machinery described herein can be set on any other type of mounting surface, such as a skid, truck, or a body load, in addition to the trailers as described herein. These and other similar modifications will readily suggest themselves to those skilled in the art, and are intended to be encompassed within the spirit of the present invention disclosed herein and the scope of the appended claims.

What is claimed is:

1. A hydraulic fracturing system for fracturing a subterranean formation comprising:

a hydration unit having an inlet in communication with a source of fluid and with a source of additive, and having a discharge that selectively contains a mixture of the fluid and additive;

a blender having an inlet in communication with a source of proppant and with the discharge of the hydration unit, and having a discharge that selectively contains a mixture of the fluid, additive, and proppant to define a slurry;

a fracturing pump having an inlet in communication with the discharge of the blender, and a discharge in communication with the formation;

a trailer on which the hydration unit or blender is mounted;

noise reduction panels arranged along an outer periphery of the trailer and which extend from an upper surface of the trailer to above a piece of rotating machinery mounted on the trailer, the noise reduction panels comprising a layer of sound absorbing material; and a cooling system mounted to the piece of rotating machinery that comprises an intake shroud with an opening facing the upper surface of the trailer and sidewalls that gradually converge towards one another to maintain a substantially laminar flow in the shroud, and a discharge formed on a housing of the rotating machinery that is in fluid communication with the intake shroud and that comprises a discharge louver having an entrance that lies in a plane substantially perpendicular with the upper surface of the trailer, and an exit that faces the upper surface of the trailer.

2. The hydraulic fracturing system of claim 1, wherein the discharge louver comprises laterally spaced apart vertical side walls, and an outer surface extending between the vertical side walls.

3. The hydraulic fracturing system of claim 2, wherein the outer surface has a portion attached to the housing of the rotating machinery that lies in a plane substantially parallel with the upper surface of the trailer, and a portion distal from the housing of the rotating machinery that lies in a plane substantially perpendicular with the upper surface of the trailer.

4. The hydraulic fracturing system of claim 1, further comprising noise insulation material mounted to the discharge louver.

5. The hydraulic fracturing system of claim 1, further comprising a natural gas powered turbine generator having an electrical output in communication with the blender, hydration unit, and fracturing pump, and a housing around the turbine generator, wherein the housing comprises noise abatement material.

6. The hydraulic fracturing system of claim 5, wherein the housing around the turbine generator comprises a door frame formed from a pair of U-shaped sections joined together that define a cavity, and wherein noise abatement material is disposed in the cavity.

7. The hydraulic fracturing system of claim 5, further comprising a skirt that extends between the housing and the ground, wherein the skirt comprises noise abatement material.

8. The hydraulic fracturing system of claim 1, further comprising a compressor unit having a compressor with an inlet in communication with a supply of natural gas, and an exit in communication with a compressor, a housing covering the unit that comprises noise abatement material, an enclosure having discharge piping containing gas compressed by the compressor, and a fan that draws cooling air into the enclosure that exits the enclosure from an opening on an upper surface of the enclosure.

9. The hydraulic fracturing system of claim 1, wherein the cooling system comprises a motor attached to an air blower.

10. The hydraulic fracturing system of claim 9, further comprising a cover having an upper surface disposed over the motor and air blower, side walls that extend downward from the upper surface and past the opening of the intake shroud, and an inlet to the cover disposed distal from the opening to the intake shroud.

11. The hydraulic fracturing system of claim 1, further comprising a proppant source comprising silos, a dust recovery system having a blower system and filters, and noise reduction panels disposed around the blower system and panels, wherein the noise reduction panels comprise noise abatement material.

12. The hydraulic fracturing system of claim 1, further comprising a plurality of fracturing pumps that are arranged in a row, and a sound wall disposed adjacent an end of the row, wherein the sound wall comprises a frame mounted to a base, vertical and horizontal beams mounted to the frame, and planar wall panels set between adjacent vertical and horizontal beams, and wherein the wall panels comprise noise abatement material.

13. The hydraulic fracturing system of claim 12, further comprising a plurality of turbine generators arranged in a row, and compressor units arranged in a row and that are disposed substantially perpendicular to and adjacent the turbine generators, and sound walls disposed on opposing ends of the row of compressors, and adjacent to the compressors on a side that is opposite from the turbine generators.

* * * * *